United States Patent
Uppal et al.

(10) Patent No.: US 11,022,186 B2
(45) Date of Patent: Jun. 1, 2021

(54) SELECTABLE ONE-WAY COUPLING WITH DEBRIS CONTAINMENT

(71) Applicant: MAGNA POWERTRAIN, INC., Concord (CA)

(72) Inventors: Ranjit Uppal, Brampton (CA); Myron R. Samila, Toronto (CA); Sean A. Steele, Mississauga (CA); Dusan Milacic, North York (CA)

(73) Assignee: MAGNA POWERTRAIN, INC., Concord (CA)

(*) Notice: Subject to any disclaimer, the term of this patent is extended or adjusted under 35 U.S.C. 154(b) by 0 days.

(21) Appl. No.: 16/382,903

(22) Filed: Apr. 12, 2019

(65) Prior Publication Data

US 2019/0323568 A1    Oct. 24, 2019

Related U.S. Application Data

(60) Provisional application No. 62/677,288, filed on May 29, 2018, provisional application No. 62/659,384, filed on Apr. 18, 2018.

(51) Int. Cl.
| | |
|---|---|
| *F16D 27/102* | (2006.01) |
| *F16D 41/12* | (2006.01) |
| *F16D 41/14* | (2006.01) |
| *F16D 48/06* | (2006.01) |
| *F16D 27/01* | (2006.01) |

(52) U.S. Cl.
CPC .......... *F16D 27/102* (2013.01); *F16D 41/12* (2013.01); *F16D 41/14* (2013.01); *F16D 48/064* (2013.01); *F16D 27/01* (2013.01)

(58) Field of Classification Search
CPC .......... F16D 41/12–16; F16D 27/00–14; F16D 41/30
See application file for complete search history.

(56) References Cited

U.S. PATENT DOCUMENTS

| | | | |
|---|---|---|---|
| 5,937,980 A | 8/1999 | Dick | |
| 6,186,299 B1 | 2/2001 | Ruth | |
| 9,181,993 B1 | 11/2015 | Swales et al. | |
| 10,066,679 B2 * | 9/2018 | Cioc | F16D 27/09 |
| 10,544,842 B2 * | 1/2020 | Klaser | F16D 27/004 |
| 10,590,998 B2 * | 3/2020 | Hand | F16D 41/14 |
| 2012/0149518 A1 | 6/2012 | Kimes | |
| 2013/0256078 A1 | 10/2013 | Kimes et al. | |

(Continued)

FOREIGN PATENT DOCUMENTS

| | | |
|---|---|---|
| JP | 5205211 B2 | 6/2013 |
| WO | WO2012078203 A1 | 6/2012 |
| WO | WO2015127546 A1 | 9/2015 |

*Primary Examiner* — Ernesto A Suarez
*Assistant Examiner* — James J Taylor, II
(74) *Attorney, Agent, or Firm* — Dickinson Wright PLLC

(57) ABSTRACT

A selectable one-way clutch includes a clutch module and an electromagnetic actuator module. The electromagnetic actuator module includes an electromagnetic actuator and a strut assembly. The electromagnetic actuator having a coil assembly with a magnetic pole piece. The strut assembly having a strut and a magnetic armature mechanically interconnected to the strut for moving the strut between released and deployed positions in response to energization of the coil assembly. A contamination shroud is disposed between the armature and the pole piece to prevent collection of debris therebetween.

20 Claims, 31 Drawing Sheets

(56) References Cited

U.S. PATENT DOCUMENTS

| | | |
|---|---|---|
| 2013/0319812 A1 | 12/2013 | Wys et al. |
| 2014/0102844 A1 | 4/2014 | Greene et al. |
| 2014/0284167 A1 | 9/2014 | Kimes |
| 2014/0305761 A1 | 10/2014 | Kimes |
| 2015/0001023 A1 | 1/2015 | Kimes et al. |
| 2015/0060225 A1 | 3/2015 | Kimes |
| 2015/0204391 A1 | 7/2015 | Kimes |
| 2015/0204392 A1 | 7/2015 | Kimes |
| 2016/0160941 A1 | 6/2016 | Green et al. |
| 2016/0201738 A1 | 7/2016 | Kimes |
| 2016/0201739 A1 | 7/2016 | Kimes |
| 2016/0201740 A1 | 7/2016 | Kimes |
| 2017/0204917 A1 | 7/2017 | Bird et al. |

\* cited by examiner

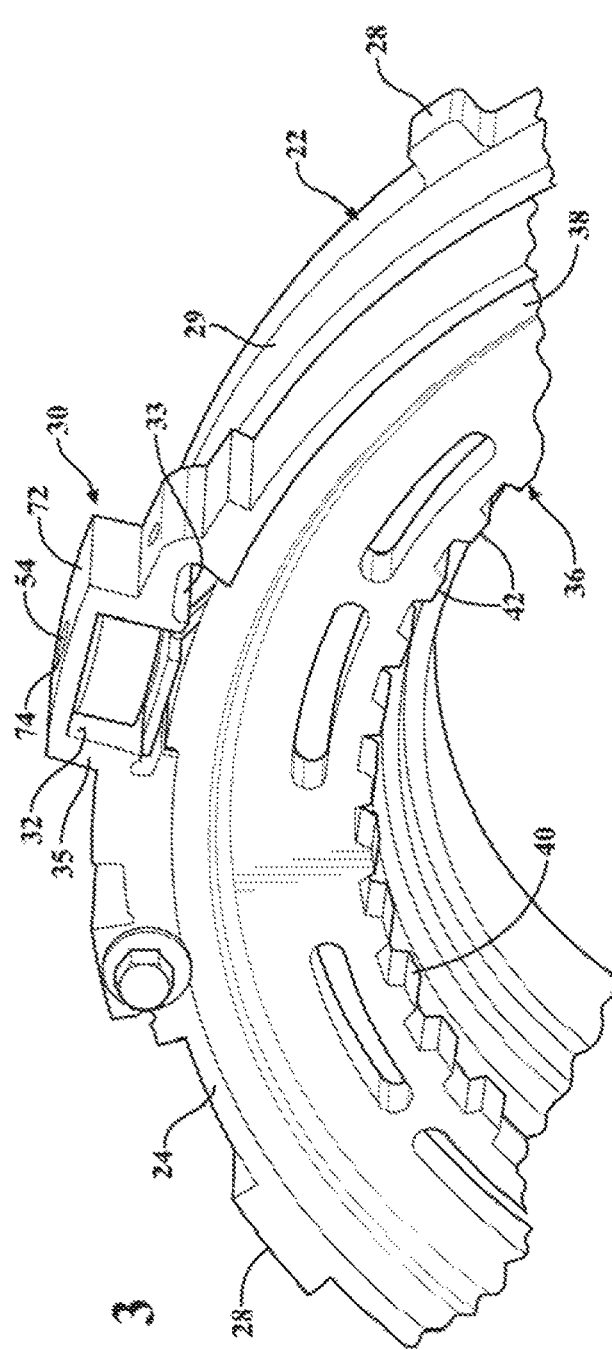
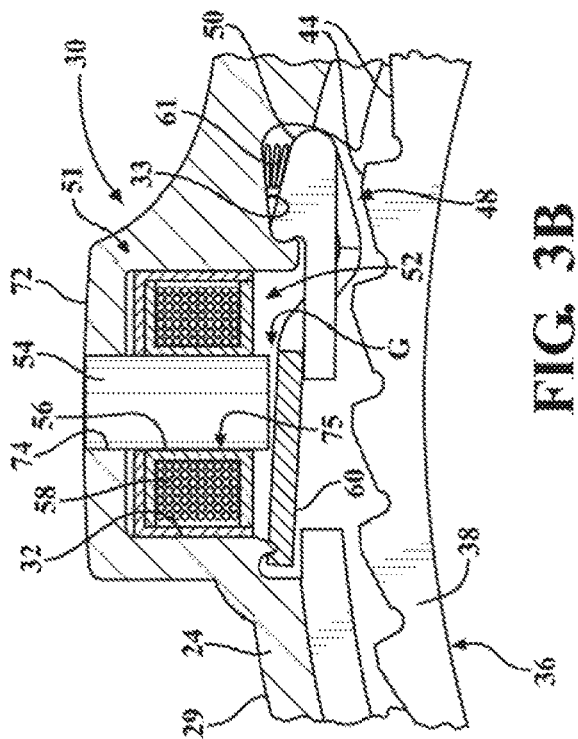
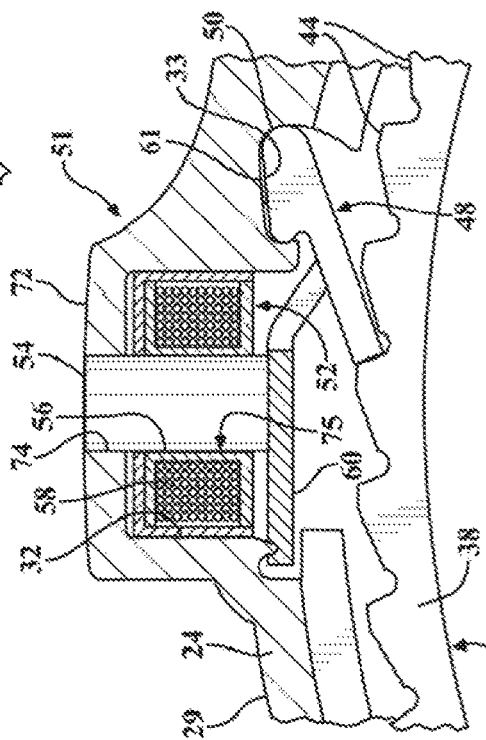
FIG. 3
FIG. 3A
FIG. 3B

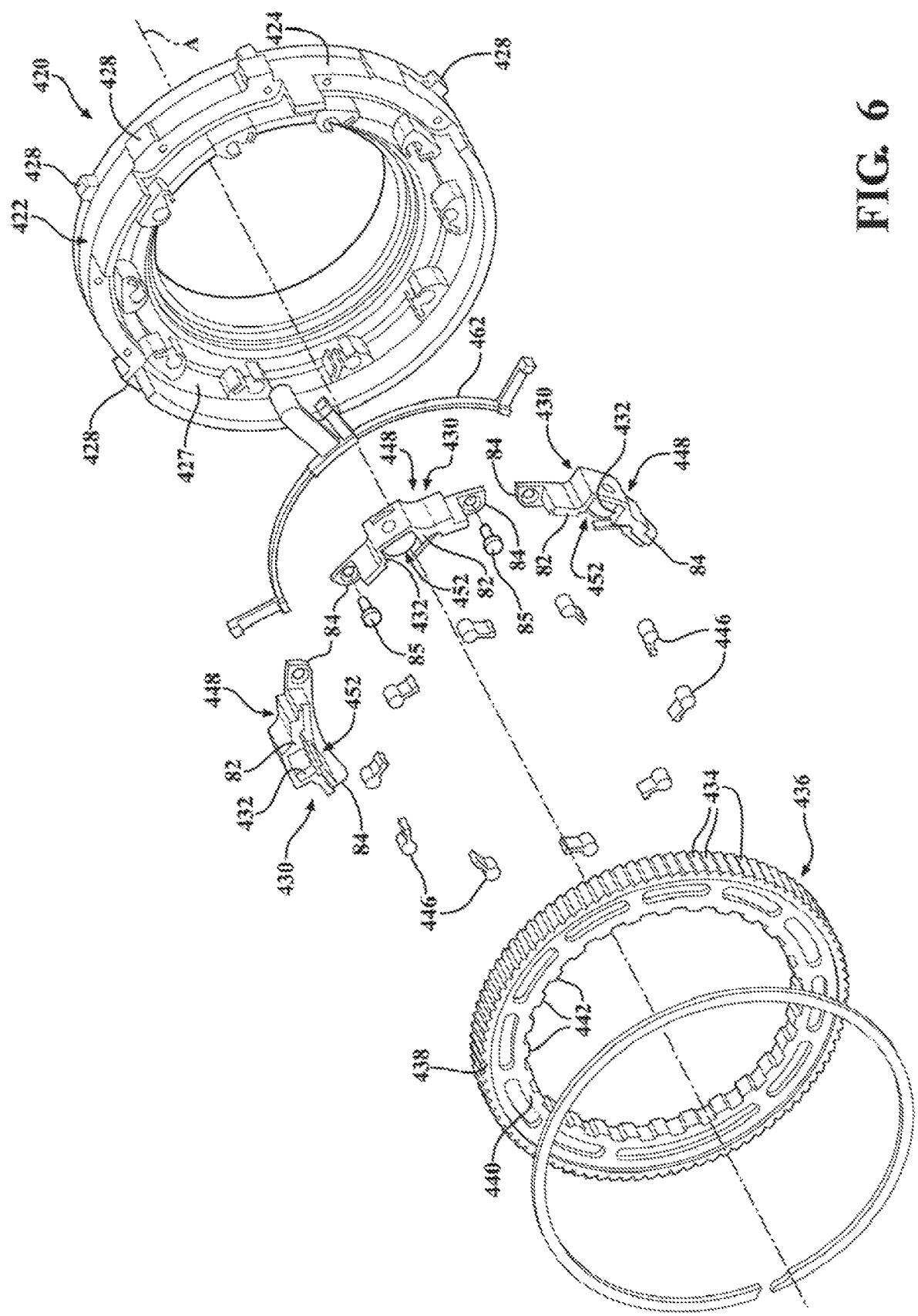

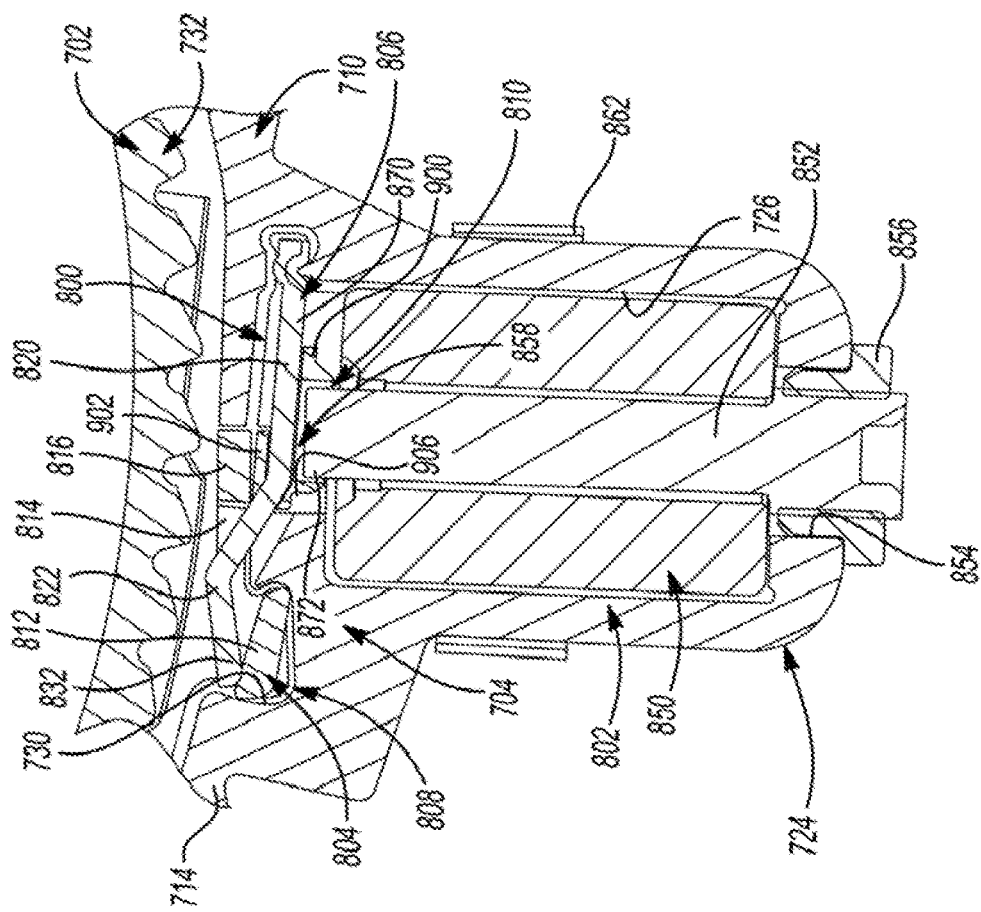
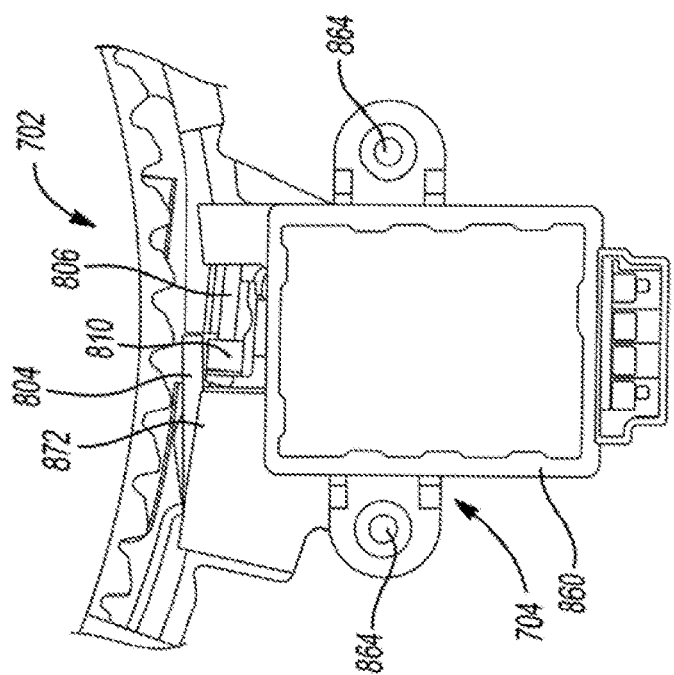

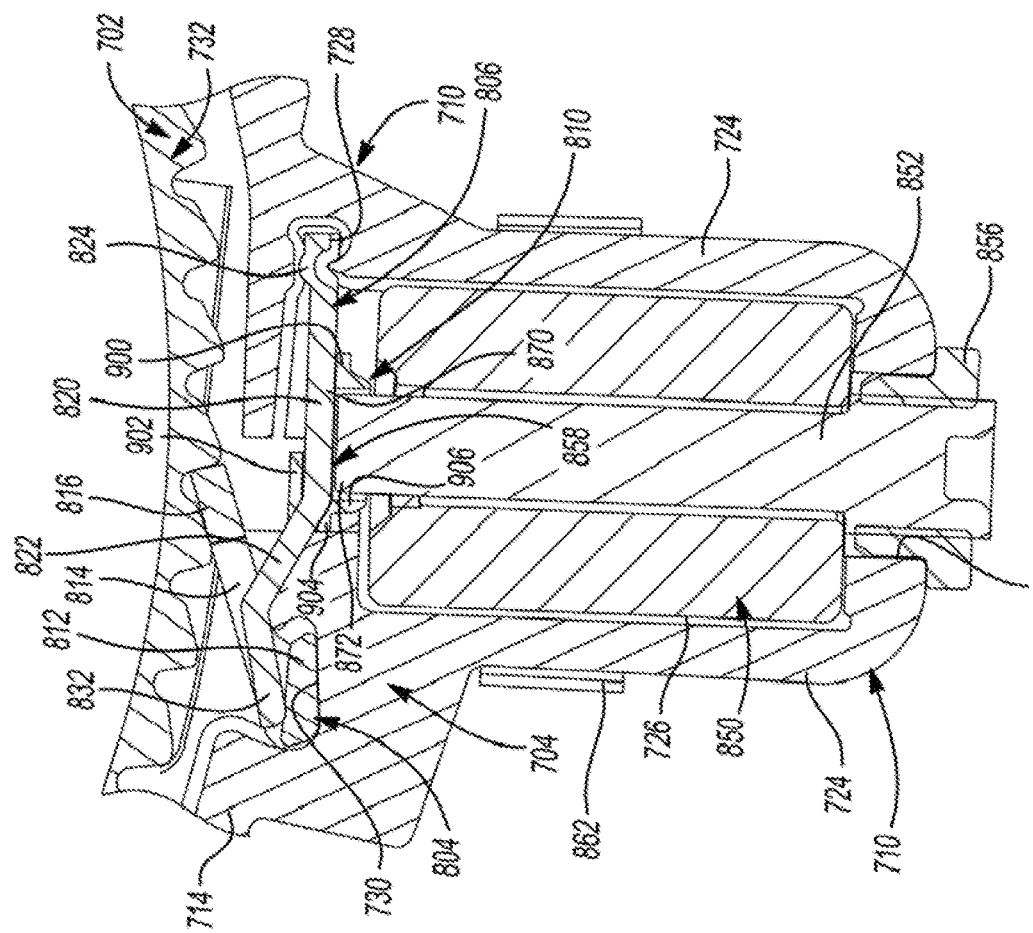

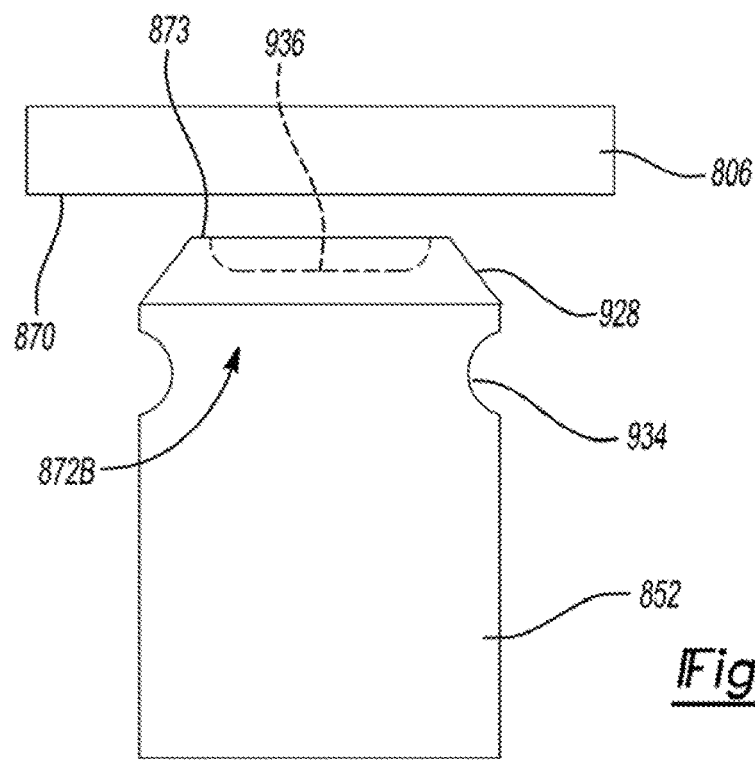
_Fig-29A_
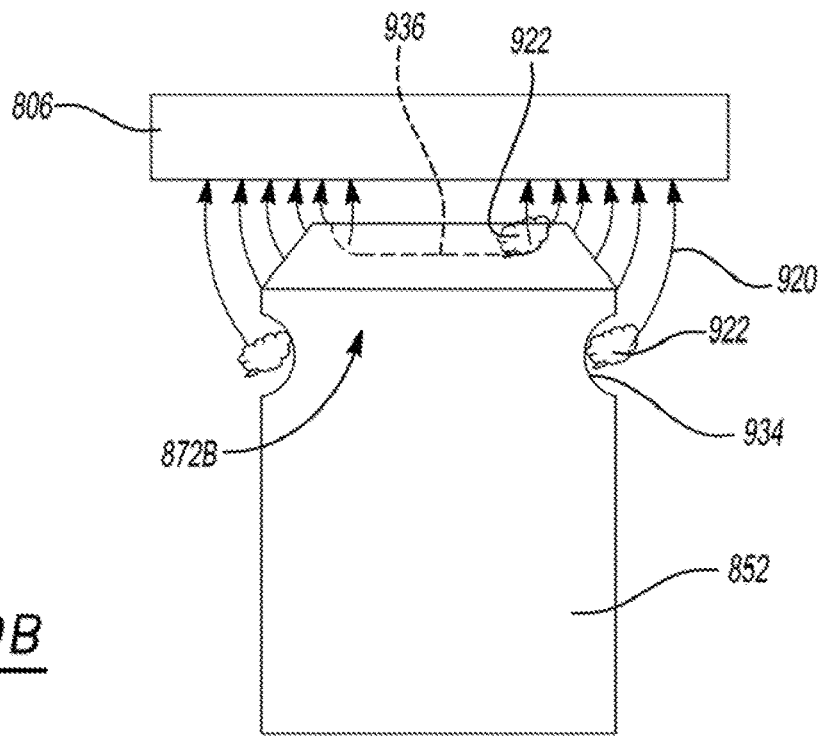
_Fig-29B_

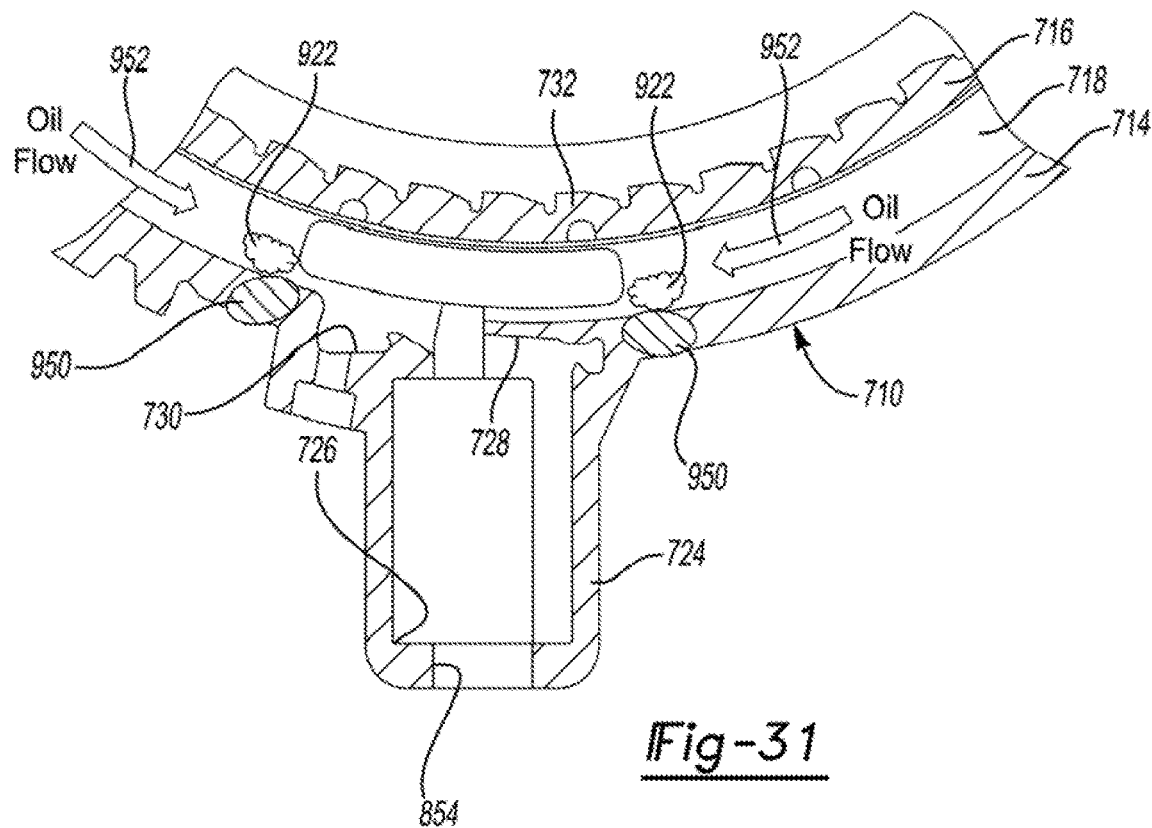
_Fig-31_
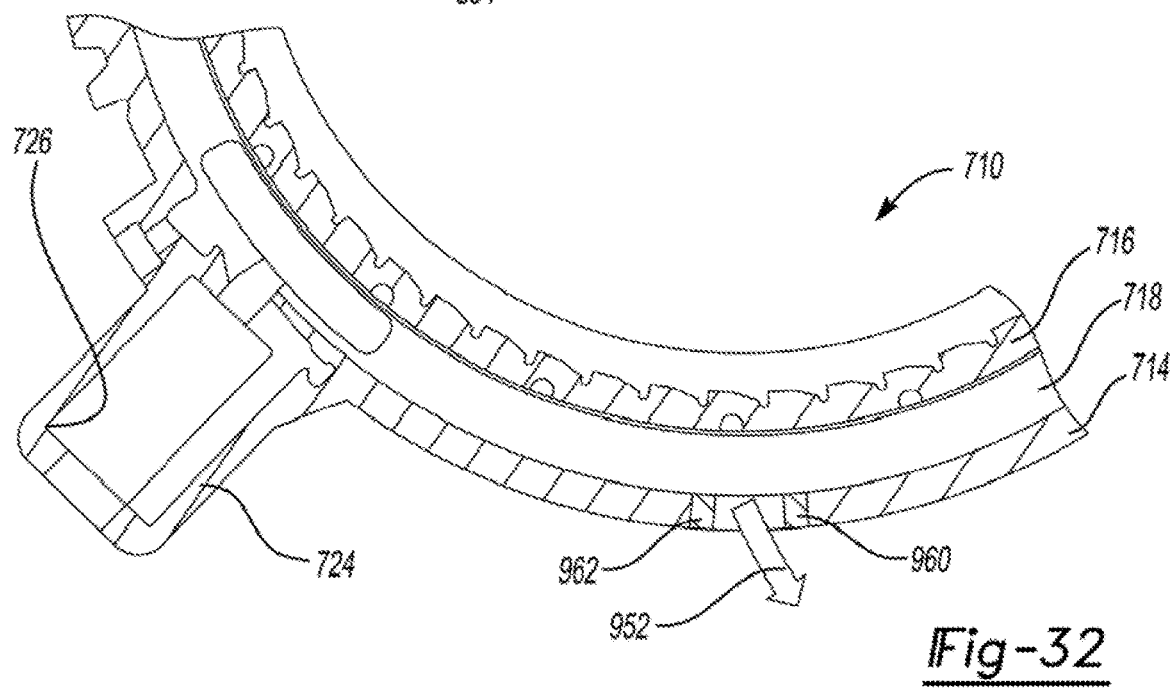
_Fig-32_

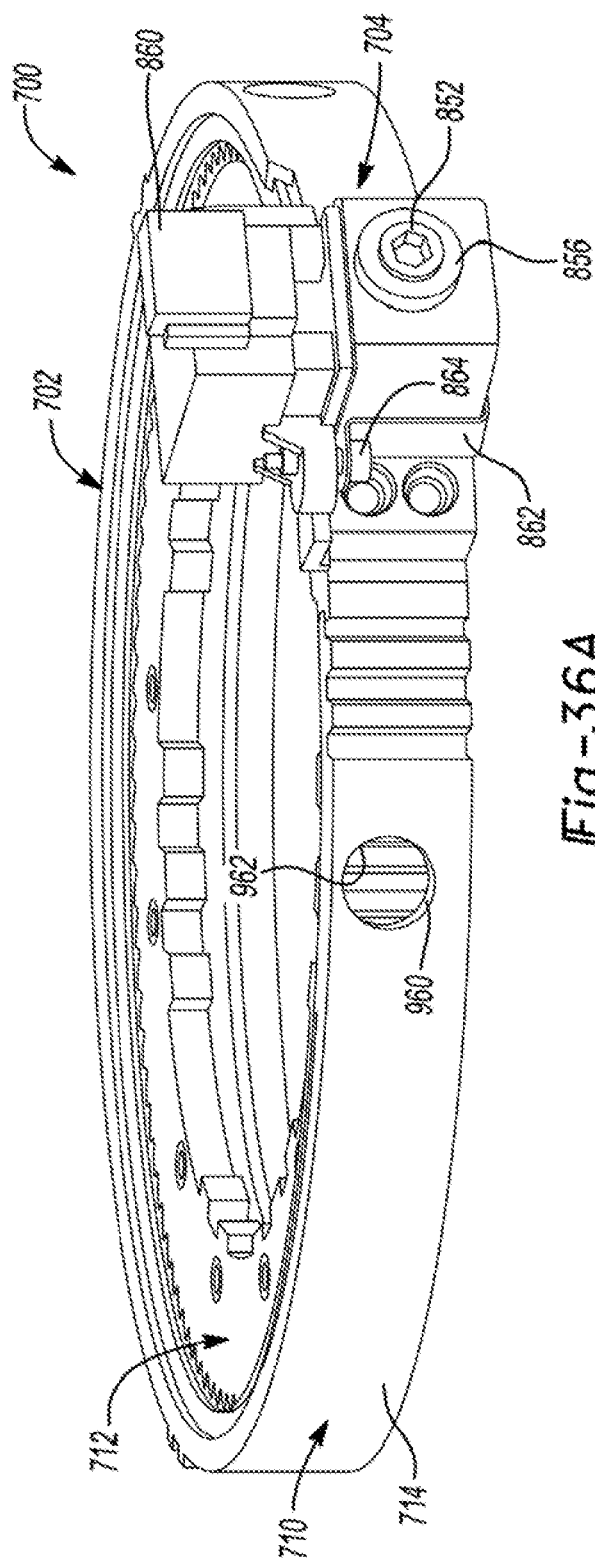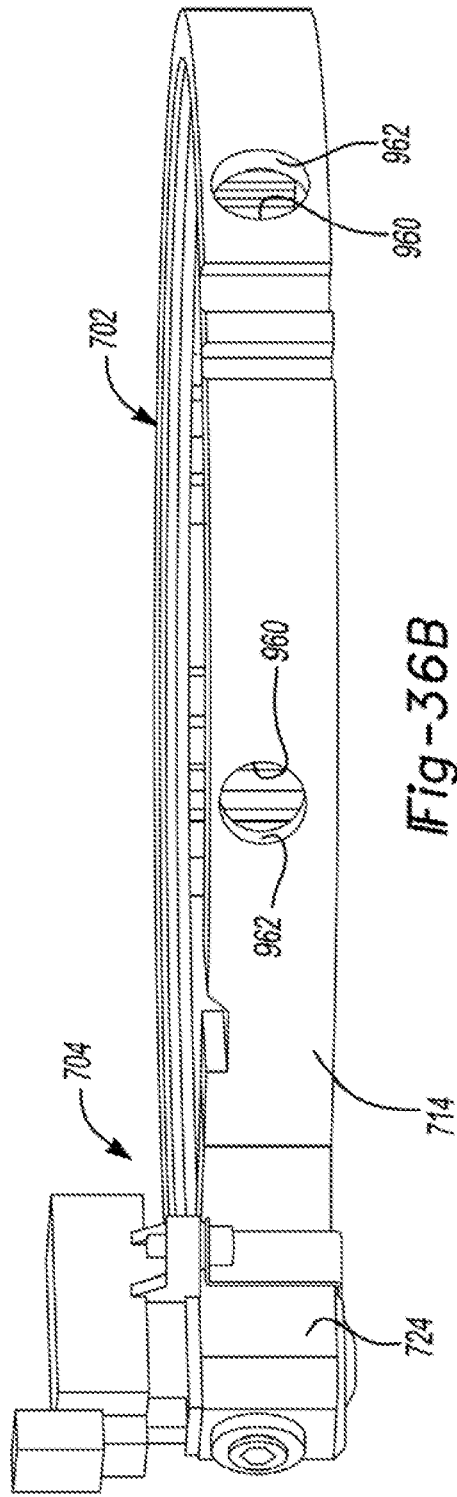

SELECTABLE ONE-WAY COUPLING WITH DEBRIS CONTAINMENT

CROSS-REFERENCE TO RELATED APPLICATIONS

This application claims the benefit of U.S. Provisional Application No. 62/659,384 filed on Apr. 18, 2018 and U.S. Provisional Application No. 62/677,288 filed on May 29, 2018. The entire disclosures of each of the above applications are incorporated herein by reference.

FIELD OF THE INVENTION

The present disclosure is generally related to overrunning coupling devices such as one-way clutches or brakes and, more specifically to selectable one-way coupling (SOWC) devices and/or electronically-controlled one way coupling (EOWC) devices including a deployable strut and an electromagnetic actuator having a debris containment arrangement providing improved resistance to ferromagnetic contamination and unintended deployment of the strut.

BACKGROUND OF THE INVENTION

This section provides background information related to the present disclosure which is not necessarily prior art.

Automatic transmissions provide a plurality of forward and reverse speed or gear ratios by selectively actuating one or more clutches and/or brakes to establish a torque-transmitting drive connection between a transmission input and a transmission output for supplying motive power (i.e., drive torque) from a powertrain to a driveline in a motor vehicle. One type of brake or clutch widely used in automatic transmission is an overrunning coupling device, commonly referred to as a one-way clutch (OWC), which overruns when one of its races (in radial coupling configuration) or one of its drive plates (in axial coupling configurations) rotates in a first (i.e., freewheel) direction relative to the other race or drive plate, and engages or locks in a second (i.e., lockup) direction. Typically, a locking member, such as a strut, associated with the one-way clutch is moveable between a non-deployed position to establish a "freewheel" mode and a deployed position to establish a "locked" mode. The strut is commonly biased toward one of its two positions. Such conventional one-way clutches provide no independent control over their modes of operation, that is to say whether they lockup or freewheel in both directions and are commonly referred to as passive one-way clutches. Thus, basic one-way clutches provide the "locked" mode in one rotary direction and the "freewheel" mode in the opposite direction based on the direction that the drive torque is being applied to the input race or drive plate.

There are however, requirements in modern automatic transmissions where a "controllable" overrunning coupling device, commonly referred to as either a selectable one-way clutch (SOWC) or an electrically-controlled one-way clutch (EOWC), can be selectively controlled to provide additional functional modes of operation. Specifically, a controllable one-way clutch may further be capable of providing a freewheel mode in both rotary directions until a command signal (i.e., from the transmission controller) causes a power-operated actuator to shift the coupling device into its locked mode. Thus, a controllable one-way clutch may be capable of providing a drive connection between an input member and an output member in one or both rotational directions and it may also be operable to freewheel in one or both directions. It is also known in modern automatic transmissions to integrate a passive one-way clutch and a controllable one-way clutch into a combined coupling device, commonly referred to as a bi-directional clutch.

In some instances, the controllable one-way clutch utilizes a hydraulic actuator to selectively actuate the overrunning coupling and shift between the available operating modes. It is also known to use an electromechanical actuator with the controllable one-way clutch. As a further alternative, much development has recently been directed to electromagnetic actuators for use with controllable one-way clutches. In many electromagnetic actuators, a rocker-type locking element, commonly referred to as a strut, is pivoted from a first position to a second position in response to energization of a coil assembly.

In some controllable one-way clutches, the electromagnetic actuator has a direct-acting configuration such that the strut is part of the magnetic circuit and its pivotal movement is caused by an attraction force applied directly to the strut via energization of the coil assembly. Therefore, precise control of the air gap established between the core/pole piece of the coil assembly and the magnetic strut is required to provide robust and reliable lockup functionality. As an alternative, some controllable one-way clutches are equipped with an electromagnetic actuator having an indirect-acting configuration in which an intermediate component, such as an armature or linkage, is arranged to cause pivotal movement of the strut in response to energization of the coil assembly.

During development testing of controllable one-way clutches at least one issue was identified that needed to be addressed. Specifically, under certain operating conditions of the automatic transmission, excessive oil levels are generated in the controllable one-way clutches in the vicinity of the deployable struts which can potentially result in unintended "hydraulic deployment" of the strut. Unintended hydraulic deployment is a condition where the strut is moved from its non-deployed position to its deployed position, independent of actuation of the power-operated actuator, due to a pressure gradient acting thereon. This pressure gradient, in combination with fluid dynamics associated with fluid flow around the clutch components, results in a force vector acting on an end portion of the strut. As this hydraulic force acting on the end portion of the strut increases in magnitude, it eventually overcomes the biasing force exerted on the strut by the strut return spring, thereby resulting in unintended partial or full deployment of the strut. Such unintended hydraulic deployment may cause the strut to "ratchet" against the inner race/drive plate which results in premature fatigue failure of the strut system and/or the armature associated with the power-operated actuator. Also, the impact may cause the armature/strut configuration to be deformed so as to result in loss of the primary latching function as the strut may only have partial deployment capabilities.

Another issue with electromagnetic actuators that was identified during testing relates to contamination. Specifically, debris and contaminants with iron content carried by the oil can be attracted to the magnetic field generated by the electromagnetic actuator and ultimately detrimentally impact its operation. For example, such debris containment may result in partial or "lazy" strut deployment. Upon teardown analysis, it has been noted that debris had collected along the mating surfaces of the pole piece associated with the coil assembly and the armature associated with the indirect-type strut actuation configuration. Root cause analysis confirms that this undesirably lazy strut deployment results from such debris interfering with proper movement of the armature. To address this issue, come controllable one-way clutches are being developed using stand-along solenoid actuators to move the non-magnetic strut (i.e. direct-acting) or the non-magnetic armature (indirect-acting). However, solenoid actuators may not be capable of generating adequate power requirements for strut deployment in all applications.

Accordingly, a need exists to continue development of improved electromagnetic actuators for use in controllable one-way clutches that address and overcome issues such as hydraulic strut deployment and debris contamination to provide enhanced functionality and packaging.

SUMMARY OF THE INVENTION

This section provides a general summary of the disclosure and is not intended to be considered a comprehensive listing of all of its aspects, features and objectives.

It is an aspect of the present disclosure to provide a controllable one-way clutch assembly adapted for use in a power transmission device.

It is a related aspect to provide an electromagnetic actuator module for use with a controllable one-way clutch assembly having one of a direct or an indirect configuration between an energizeable coil assembly and a pivotably moveable locking element.

It is another related aspect to provide a controllable one-way clutch assembly comprised of a clutch module and an electromagnetic actuator module having at least one electromagnetic actuator. The electromagnetic actuator includes an energizeable coil assembly, a pivotable active strut, and a coupling arrangement for mechanically moving the active strut between released and locked positions relative to ratchet teeth formed on a clutch member associated with clutch module.

In another aspect, the electromagnetic actuator is configured to include anti-deployment features operable to inhibit unintended movement of the active strut toward its locked position in response to hydraulic fluid forces and/or fluid dynamics acting on the controllable one-way clutch assembly.

In yet another aspect, the electromagnetic actuator is configured to minimize ferromagnetic contamination within the electromagnetic actuator module so as to provide enhanced operation and functionality of the controllable one-way clutch assembly.

In accordance with these and other aspects, the electromagnetic actuator module includes an active strut assembly and an actuator assembly. The active strut assembly includes an active strut moveable between non-deployed and deployed positions, an active strut biasing arrangement biasing the active strut toward its non-deployed position, and a magnetic armature moveable between a non-actuated position and an actuated position. The armature, active strut and active strut biasing arrangement are configured such that movement of armature between its non-actuated and actuated positions results in corresponding movement of the active strut between its non-deployed and deployed positions. The actuator assembly includes a coil unit and a magnetic pole piece having a tip portion located in proximity to the armature such that energization of the coil unit causes the armature to be magnetically attracted to the pole piece and cause the armature to move from its non-actuated position into its actuated position. A debris collection preventing arrangement is provided which functions to inhibit collection of debris within and around the components of the active strut assembly and the actuator assembly.

In one embodiment, the debris collection preventing arrangement includes installing a non-magnetic contamination shield or shroud on the armature and which surrounds the tip portion of the magnetic pole piece during movement of the armature relative thereto.

In accordance with a second embodiment, the debris collection preventing arrangement includes modifying the tip portion of the magnetic pole piece to define at least one of a chamfered edge, an annular groove formed within or below the chamfered edge, and a collection cavity in the face surface of the tip portion.

In accordance with a third embodiment, the debris collection preventing arrangement includes applying a non-magnetic layer or coating to the tip portion of the pole piece and/or to the armature.

In accordance with a fourth embodiment, the debris collection preventing arrangement includes providing magnets located outward from the electromagnetic actuator module and which function to collect debris.

Further areas of applicability of the present disclosure will become apparent from the detailed description, drawings and specific example provided hereinafter. It should be understood that the detailed description, drawings and specific examples, while indicating preferred embodiments of the present disclosure, are intended for purposes of illustration only and are not intended to limit the scope of the invention.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein:

FIG. 3 is an assembled partial isometric view of the clutch assembly shown in FIG. 1;

FIGS. 3A and 3B are sectional views of the electromagnetic actuator of FIG. 3 with an active strut of an active strut assembly shown in locked (i.e. deployed) and unlocked (i.e. non-deployed) positions, respectively, in response to respective energized and de-energized states of the electromagnetic actuator;

FIG. 6 is an exploded isometric view of a bi-directional clutch assembly configured to include a modular active strut arrangement for a selectable one-way clutch in accordance with another aspect of the present disclosure;

FIGS. 18A-18C illustrate an inner race associated with the clutch module shown in FIGS. 17A and 17B, while

FIGS. 20A-20B are isometric views of the passive strut associated with the passive strut assembly of FIGS. 19A and 19B, while

FIG. 21A is a partial view of the electromagnetic actuator module operably mounted to an outer race of the clutch module and FIG. 21B is enlarged sectional view of FIG. 21A, each illustrating an active strut in a non-deployed state with a coil assembly of the electromagnetic actuator in a non-energized state and an armature of the active strut assembly equipped with a non-magnetic contamination shield;

FIGS. 22A and 22B are generally similar to FIGS. 21A and 21B, respectively, but now illustrate the active strut in a deployed state in response to the coil assembly operating in an energized state;

FIGS. 29A and 29B illustrate alternative debris retention features associated with the pole piece of the coil assembly;

FIG. 31 is a partial sectional view of the outer race of the clutch module equipped with magnets on opposite sides of the electromagnetic actuator and which function to provide a debris collection feature;

FIG. 32 is similar to FIG. 31 but now illustrates the outer race equipped with a magnet within an oil discharge orifice and which functions to provide another alternative debris collection feature;

FIGS. 36A and 36B are isometric views of the controllable one-way clutch assembly having the outer race of the clutch module equipped with multiple pressed-in magnets for debris collection.

Corresponding reference numerals will be used throughout the drawings to identify common components.

DESCRIPTION OF THE ENABLING EMBODIMENTS

Example embodiments will now be described more fully with reference to the accompanying drawings. In general, each embodiment is directed to a overrunning coupling device (i.e. brake and/or clutch) having at least a controllable one-way locking device including a moveable locking component (i.e. sprag, strut, etc.) that is controlled, at least in part, via an electromagnetic actuator. Thus, the one-way locking device transmits torque mechanically but is actuated via an electrical actuation system. However, the example embodiments only are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
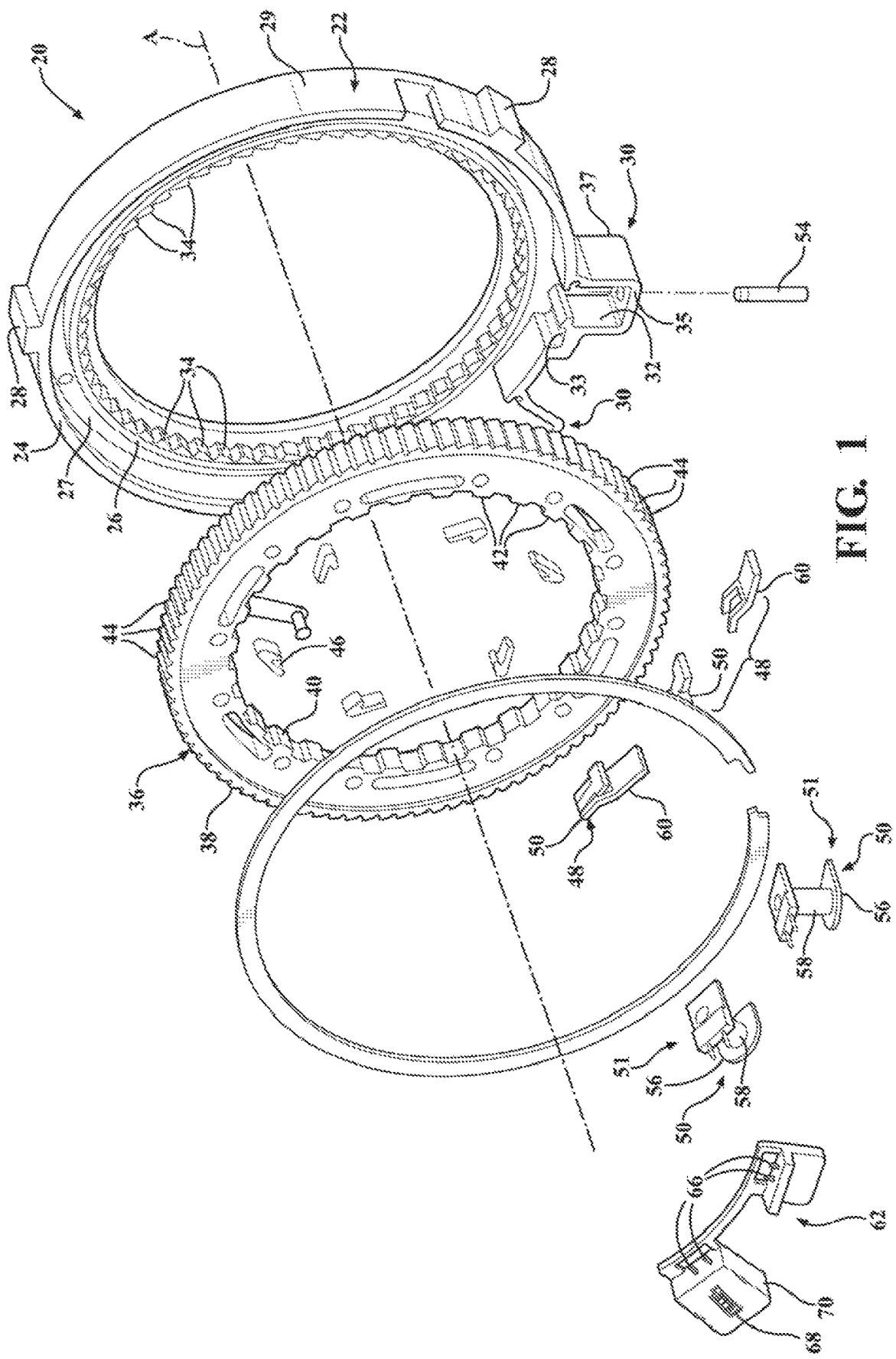
FIG. 1 is an exploded isometric view of a bi-directional clutch assembly configured to include a passive one-way clutch and a controllable one-way clutch having an electromagnetic actuator and a lead frame with an integrated safety switch in accordance with an aspect of the disclosure.
Figure 2:
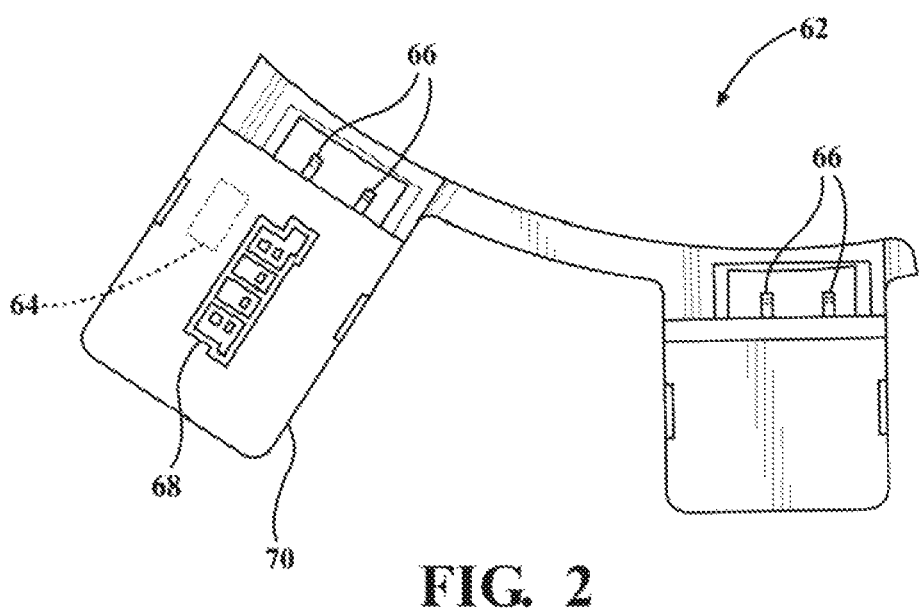
FIG. 2 is a front view of the lead frame and integrated safety switch of FIG. 1.

Referring to FIGS. 1-3, wherein like numerals indicate corresponding parts throughout the several views, a bi-directional clutch assembly 20 is generally shown. As will be detailed, bi-directional clutch assembly 20 generally includes a clutch module have a stationary first clutch member or outer race 22 and a rotatable second clutch member or inner race 36, a passive one-way clutch having a plurality of passive struts, and a controllable one-way clutch having at least one active strut assembly and an electromagnetic actuator. Outer race 22 extends annularly about an axis A and includes an outer ring segment 24 and an inner ring segment 26 that are spaced radially from one another and interconnected via a radial web segment 27. The outer ring segment 24 presents a plurality of outer lugs 28 that extend radially outwardly from the outer surface 29 for mating with a first component. The first component can be a stationary component (such as a housing of a transmission) or a rotary component (such as a shaft). The outer ring segment 24 further presents at least one protrusion 30 that extend radially outwardly from the outer surface 29. Each of the protrusions 30 defines a radially extending actuator pocket 32 and a strut pocket 33. It should be appreciated that more or fewer protrusions 30 could be utilized. The inner ring segment 26 presents a plurality of inner ramp surfaces, hereinafter referred to as inner ratchet teeth 34, that extend radially inwardly and are evenly distributed about the axis A.

Inner race 36 also extends annularly about the axis A and has an outer rim 38 and an inner rim 40 that are spaced radially from one another by a radial web segment 41. The outer rim 38 is disposed radially between the outer and inner ring segments 24, 26 of the outer race 22, and the inner rim 40 is disposed radially inwardly from the inner ring segment 26 of the outer race 22. The inner rim 40 of the inner race 36 presents a plurality of inner lugs 42 that extend radially inwardly for mating with a second component (typically a rotary component). Commonly, lugs 42 interconnect a shaft or clutch plates for rotation with inner race 36. Further, the outer rim 38 of the inner race 36 presents a plurality of outer ramp surfaces, hereinafter referred to as outer ratchet teeth 44, that extend radially outwardly and are evenly distributed about the axis A.

The passive one-way clutch includes a plurality of locking elements, also referred to as passive struts 46, which are pivotally supported in strut apertures formed in the inner race 36 for pivoting between a locking position and an unlocking position. In the locking position, the passive struts 46 engage the inner ratchet teeth 34 of the outer race 22 for connecting the outer and inner races 22, 36 to one another during counter-clockwise rotation of the inner race 36 relative to the outer race 22. Therefore, engagement by one or more of the passive struts 46 prevents relative displacement of the outer and inner races 22, 36 in the counter-clockwise direction. However, the passive struts 46 still allow relative displacement, i.e., overrun, in the clockwise direction when located in the locked position since they ratchet over the ramped profile of the inner ratchet teeth 34. In the unlocking position, the passive struts 46 are radially spaced from the inner ratchet teeth 34 of the outer race 22, therefore also allowing counter-clockwise rotation of the inner race 36 relative to the outer race 22.

In association with the controllable one-way clutch, the electromagnetic actuator module includes at least one active strut assembly 48 and corresponding number of electromagnetic actuators 51. One active strut assembly 48 is disposed within each of the strut pockets 33 formed in the outer ring segment 24. Each active strut assemblies 48 includes an active strut 50 that is selectively pivotal between a locked (deployed) and an unlocked (non-deployed) position. In the locked position, the active strut 50 lockingly engages the outer ratchet teeth 44 on the inner race 36, thereby locking the outer and inner races 22, 36 to one another during clockwise movement of the inner race 22 relative to the outer race 22. However, the active strut 50 still allows relative displacement, i.e., overrun, in the counter-clockwise direction. In the unlocked position, the active strut 50 is radially spaced from the outer ratchet teeth 44, thereby allowing the inner and outer races 22, 36 to rotate relative to one another. Furthermore, each active strut assemblies 48 includes an armature 60 that is disposed adjacent to, and in operable association with, the active strut 50 for providing the pivotal movement of the active strut 50.

The electromagnetic actuator module of the selectable one-way clutch is shown to include a pair of electromagnetic actuators 51, with each having a coil assembly 52 mounted in the actuator pocket 32 and being radially spaced from the active strut 50 and the armature 60. The coil assembly 52 includes a core 54 of a magnetically permeable material, a bobbin 56 disposed about the core 54, and a wire coil 58 wrapped about the bobbin 56. Furthermore, the armature 60 is disposed between the active strut 50 and the coil 58 for pivoting toward the core 54 in response to energization of coil 58 and thus providing the pivotal movement of the active strut 50. Armature 60 can be made of a magnetic material so as to be magnetically attracted to core upon energization of coil 58 or made of a non-magnetic material so as to be mechanically-coupled to a moveable component (solenoid) in alternative actuators 51.

In a preferred but non-limiting arrangement, when voltage and/or current are applied to the coil 58, the coil 58 becomes an electromagnet producing an electric field (or flux). The flux flows outwards in all directions and transfers through the small air gap between the armature 60 and core 54 in the center of the coil assembly 52. The core 54 becomes magnetized, therefore attracting the armature 60 towards the core 54. The resulting motion forces the active strut 50 to mechanically deploy due to the linkage between the active strut 50 and the armature 60. Upon deployment, the active strut 50 moves from its unlocked position (FIG. 3B) to its locked position (FIG. 3A) where it locates itself against one of the outer ratchet teeth 44 of the inner race 36, effectively locking the inner race 36 from rotating in that direction. Disengagement occurs as voltage and/or current is removed from the coil assembly 52, wherein the armature 60 is demagnetized and free from magnetic attraction to the core 54 of the coil assembly 52. A biasing member, such as a strut return spring 61, is positioned within strut pocket 33 between the active strut 50 and the outer race 22, causing the active strut 50 to move back to its unlocked position upon de-energization of the coil assembly 52 and the demagnification of the core 54.

It should be appreciated that the arrangement of the armature 60, active strut 50, and coil assembly 52 can act to apply a locking force in a radial direction (as shown in FIG. 1) or an axial direction, depending on the layout and/or requirements of the clutch assembly 20. Radial stacked clutch assembly 20 designs offer packaging advantages over their axial counterparts in situations where axial space is tight, e.g., in automatic transmissions. Further, radially applied clutches transmit driving torque directly outwards to be grounded against the transmission housing without the fear of forces being directed axially which could cause problems for the sizing of other system components to compensate for axial force.

A lead frame 62 is attached to each of the electromagnetic actuators 51 for electrically connecting the coils 58 to one another for energizing the coils 58. It should be appreciated that the lead frame 62 could connect any number of coils 58. A printed circuit board (PCB) 64 is attached to the lead frame 62 for selectively controlling the energization of the coils 58. The circuit board 64 is disposed radially and axially adjacent to one of the coils 58. The lead frame 62 further includes at least one power output contact 66 that is disposed radially and axially adjacent to each of the coils 58 for electrically connecting to the coils 58 to provide power to the coils 58. Any number of power contacts 66 could be utilized to power any number of coils 58. A resistance welded connection is utilized to connect the power output contact 66 and the coils 58, however, other connections could alternatively be utilized. Furthermore, at least one wire (not shown) extends between the circuit board 64 and each of the power output contacts 66 for electrically connecting the circuit board 64 and the power output contacts 66. The lead frame 62 also includes a wire harness 68 that extends from the circuit board 64 for connecting to a transmission control module (TCM) or a powertrain control module (PCM) for transmitting data to the circuit board 64 and to power the circuit board 64. Additionally, the lead frame 62 includes a plastic encapsulation or casing 70 that is disposed about the circuit board 64 and the wires for protecting the circuit board 64 and the wires for allowing the lead frame 62 to be submerged in Automatic Transmission Fluid and operate in −40 C to +140 C temperatures. It should be appreciated that the aforementioned configuration of the lead frame 62 and associated components provide a low-cost, modular solution that provides for a more simplified manufacturing process.

The applied voltage to the coils 58 is comprised of a High Side and Low Side and is supplied by the TCM or the PCM of a vehicle. The High Side (HS) is typically a shared power supply with other loads, and the Low Side is typically a discrete channel (LSD) that controls the discrete/individual circuit. The LSD is capable of controlling the amount of current across the coils 58. Since the LSD is typically located in the TCM/PCM, there is a requirement to have a wire harness between the electromagnetic actuators 51 and the TCM/PCM. If the wire harness suffers mechanical damage and the electromagnetic actuators 51 discrete LSD channel is "short circuited—to chassis ground", the coils may become energized. Accordingly, an Integrated High Side Fail Safe Switch (HSFSS) is provided to add another level of logic in order to control the shared High Side supply. The HSFSS is comprised of the Printed Circuit Board 64 (PCB), a High Side Switch (not shown), a transistor (not shown), and passive components (not shown). They are electrically connected to the lead frame 62. It should be appreciated that the configuration of the lead frame 62 protects the integrated electronic components (including the HSFSS), and provides improved packaging and reduced wiring. Furthermore, it should be appreciated that the modular configuration of the lead frame 62 and associate components could be utilized on other clutch assembly configurations, e.g., axially engaging clutch assemblies. The HSFSS is controlled by the OWCC_HS_ENABLE, which enables the HSFSS to pass current to the coils 58. FIG. 3 illustrates an exemplary embodiment of a circuit that could be utilized with the printed circuit board 64 according to an aspect of the disclosure.

Referring to FIGS. 3, 3A and 3B, in an example embodiment of the protrusions 30, the open side surface 35 defines the actuator pocket 32 for axially receiving the coil assembly 52. Furthermore, a radially outwardly facing outer wall 72 of the protrusion 30 provides a through passage, also referred to simply as orifice 74, that extends radially inwardly into the actuator pocket 32. In this embodiment, coil 58 and bobbin 56 are axially disposed and press fit into the actuator pocket 32 through the open side surface 35. Once in position in the actuator pocket 32, which extends radially inwardly from the outer wall 72, the core 54 is pressed radially inwardly through the orifice 74 and through a central through passage of the bobbin 56 until it reaches a predetermined, preset location which sets the magnetic gap G between an armature 60 and the free end of the core 54. The core 54 attains a press fit against an inner surface 75 that defines and bounds the through passage of the bobbin 56, thereby being fixed against movement therein. The core 54 can further be press fit in the through passage of the bobbin 56, or configured in a clearance fit therein. FIG. 3A shows an active strut 50 in the locked position as a result of energization of the coil assembly 52 and FIG. 3B shows the active strut 50 in the unlocked position as a result of de-energizing the coil assembly 52.

Figure 4A:
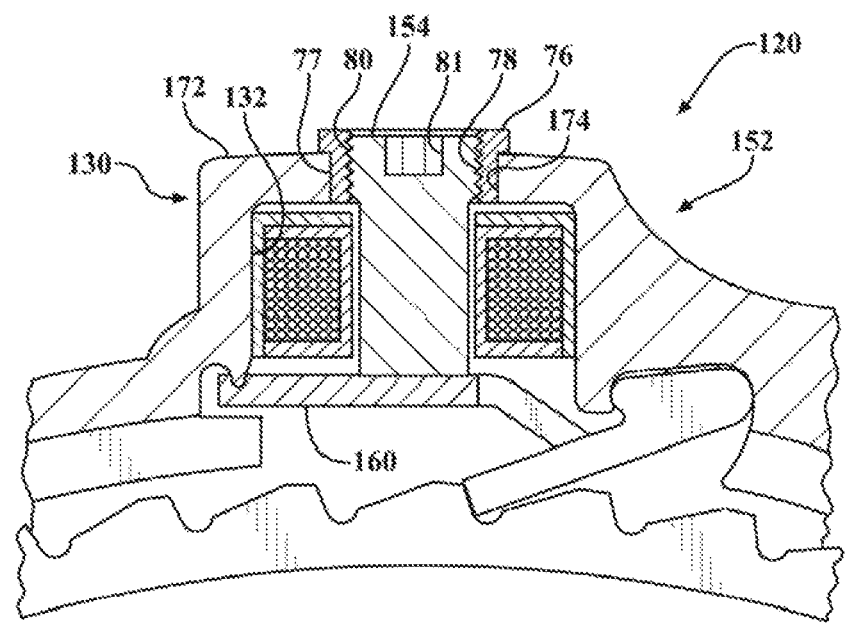
FIGS. 4A and 4B are similar views to FIGS. 3A and 3B and show an alternative embodiment of an electromagnetic actuator constructed in accordance with another aspect of the present disclosure.
Figure 4B:
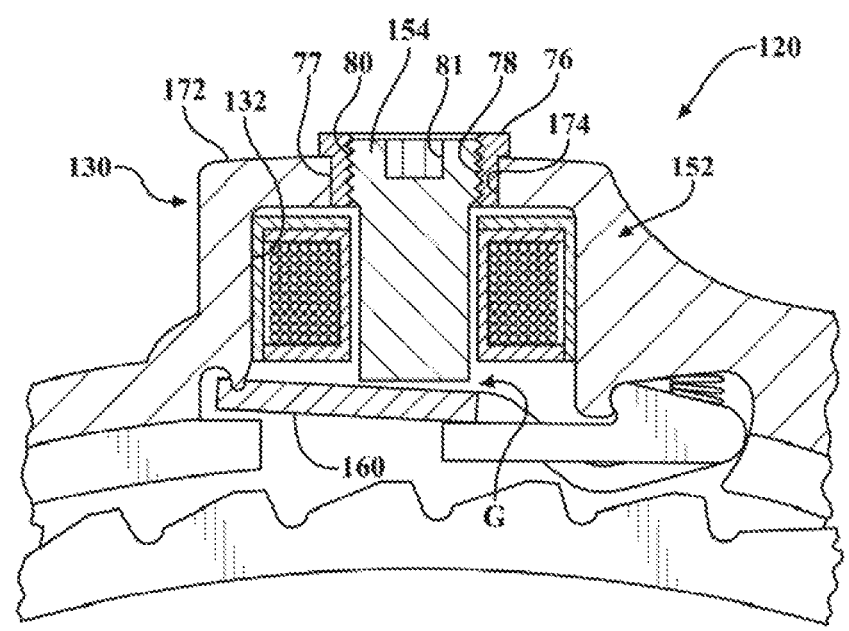

Referring to FIGS. 4A-4B, another example embodiment of an electromagnetic actuator module installed in a clutch assembly 120, similar to that discussed above with regard to FIGS. 3, 3A and 3B, is shown, wherein the same reference numerals, offset by a factor of 100, are used to identify like features. The coil assembly 152 is axially disposed and press fit into the respective actuator pockets 132, as discussed above; however, rather than directly fixing and press fitting the core 154 into an orifice 174 in an outer wall 172 of the protrusion 130, the core 154 is operably fixed in the orifice 174 in the outer wall 172 via a hollow adaptor plug, also referred to as nut 76. The nut 76 is first fixed in the orifice 174 of the protrusion, and then, the core 154 is disposed through the nut 76 and fixed thereto, whereupon the core 154 is readily adjusted to provide the desired gap G between the free end of the core 154 and the armature 160. The nut 76 is provided having an outer surface 77 configured for fixation within the orifice 174, such as via at least one of press fit, bonding agent, weld joint, threaded engagement, or other suitable mechanical and/or adhesion fixation mechanism. The nut 76 further includes a threaded through passage 78 configured for threaded engagement with an externally threaded portion 80 of the core 154, shown as a threaded fastener end portion 80. To facilitate threading the core 154 into the nut 76, the fastener end portion 80 can be provided with a tool receptacle pocket 81, wherein the pocket 81 can be configured for engagement with any standard tool drive feature, as is known in the art of fasteners. When threading the core 154 into engagement with the nut 76, the gap G between the free end of the core 154 and the armature 160 can be precisely set, as desired, such as by threading the free end of the core 154 into abutment with the armature 160, and then reverse threading and backing the core 154 radially away from the armature 160 a set distance, which can be readily derived by knowing the pitch angle of the threads on the nut 76 and core 154, by way of example and without limitation. Upon fixing the core 154 in position, the core 154 can remain free from direct attachment with the coil 158 and bobbin 156, and thus, is disposed in a clearance fit therewith, which in turn allows for readily simple adjustment and replacement of the core 154 as desired without effect on either the coil 158 or bobbin 156.

Figure 5:
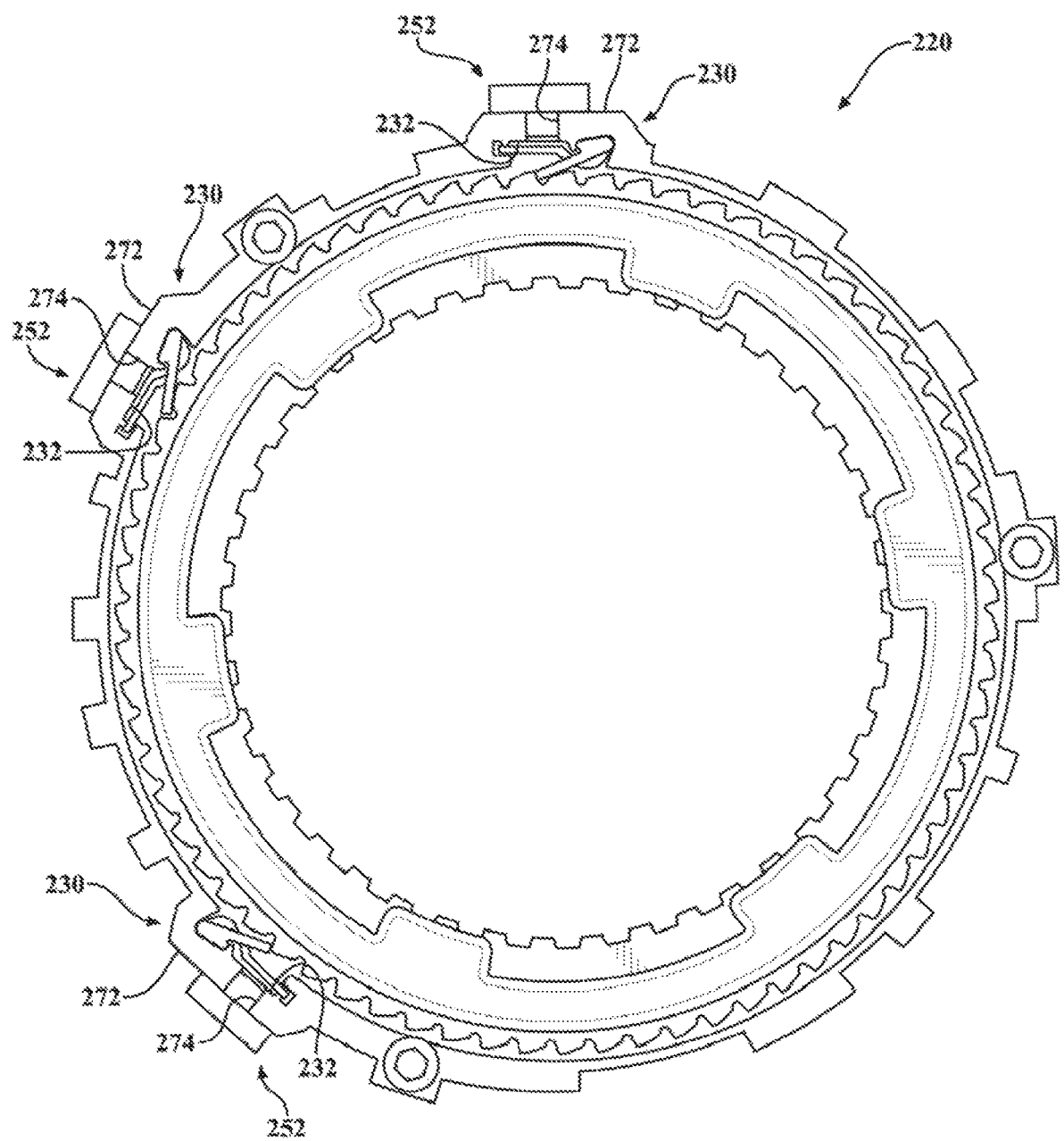
FIG. 5 illustrates a clutch assembly having a selectable one-way clutch with a press-fit electromagnetic actuator associated with an active strut assembly in accordance with another aspect of the present disclosure.
Figure 5A:
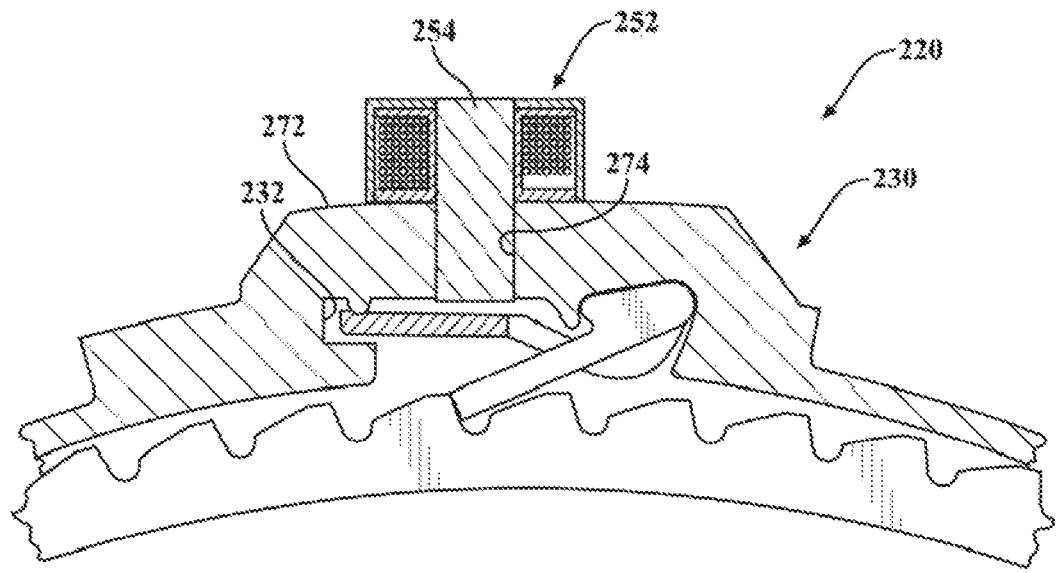
FIG. 5A is an enlarged partial sectional view of FIG. 5 illustrating a radially pressed electromagnetic actuator in accordance with one aspect of the present disclosure.
Figure 5B:
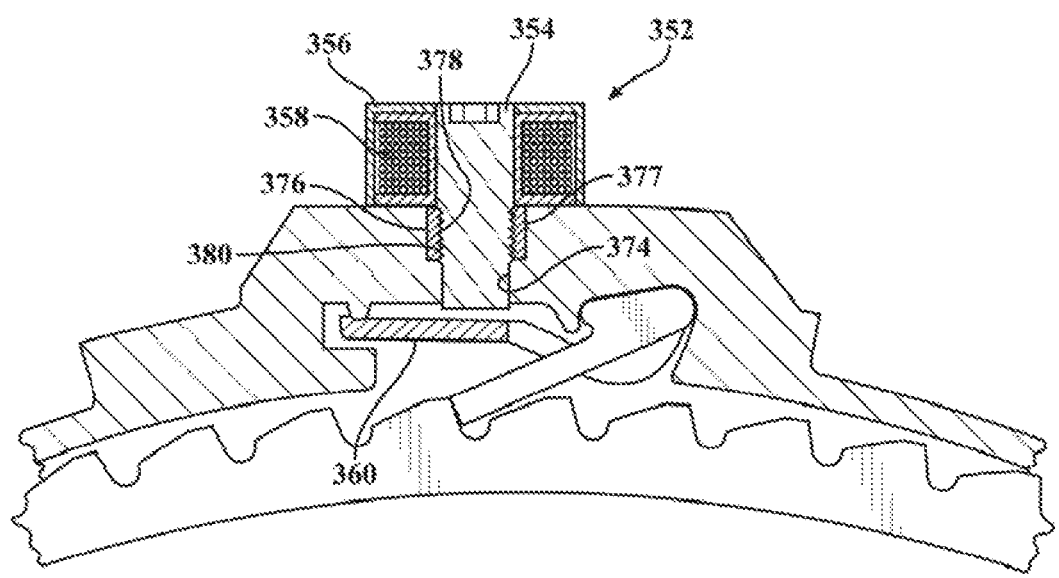
FIG. 5B is a view similar to FIG. 5A showing another version of a radially pressed electromagnetic actuator constructed in accordance with another aspect of the present disclosure.

Referring to FIGS. 5 and 5A, another example embodiment of a clutch assembly 220 is shown, wherein the same reference numerals, offset by a factor of 200, are used to identify like features. In this embodiment, an orifice 274 extends directly through the outer wall 272 of the protrusion 230 to the actuator pocket 232, wherein the orifice 274 is configured to receive the core 254 of the coil assembly 252 radially therein. The core 254 of the coil assembly 252 is pressed radially inwardly into the orifice 274 and fixed therein. As a result of the core 254 being fixed in the orifice 274, the entire coil assembly 252 is fixed in place without having access an inner portion of the protrusion 230. In the embodiment shown, the core 254 is sized for a press fit, also known as an interference fit, within the orifice 274, wherein it should be recognized that other mechanisms for fixing the core 254 in the orifice 274, other than press fit, are contemplated herein, such as discussed above with reference to adhesives, weld joints, mechanical fasteners and the like. Further, as shown in FIG. 5B, another example embodiment, similar to that discussed above with regard to FIGS. 4A and 4B, is shown, wherein the same reference numerals, offset by a factor of 300, are used to identify like features. Rather than fixing the core 354 in direct contact with the orifice 374 in the outer wall 372, a nut 376 can be used to facilitate fixing the core 354 of the coil assembly 352 in a precise setting relative to the armature 360, thereby establishing a precise gap G therebetween, as desired. The nut 376 is provided having an outer surface 377 configured for fixation within the orifice 374, such as via at least one of press fit, bonding agent, weld joint, threaded engagement, or other suitable mechanical and/or adhesion fixation mechanism. The nut 376 further includes a threaded through passage 378 configured for threaded engagement with an externally threaded portion 380 of the core 354, shown as a portion immediately adjacent the radially outwardly extending bobbin 356 and coil 358. When threading the core 354 into engagement with the nut 376, the gap G between the free end of the core 354 and the armature 360 can be precisely set, as discussed above with regard to FIGS. 4A and 4B. Upon fixing the core 354 within the nut 376, it is to be recognized that other than the core 354, the remaining portion of the coil assembly 352 remains external to the protrusion 312, and thus, can be freely accessed when desired, such that servicing the coil assembly 352 is made easy.

Figure 7:
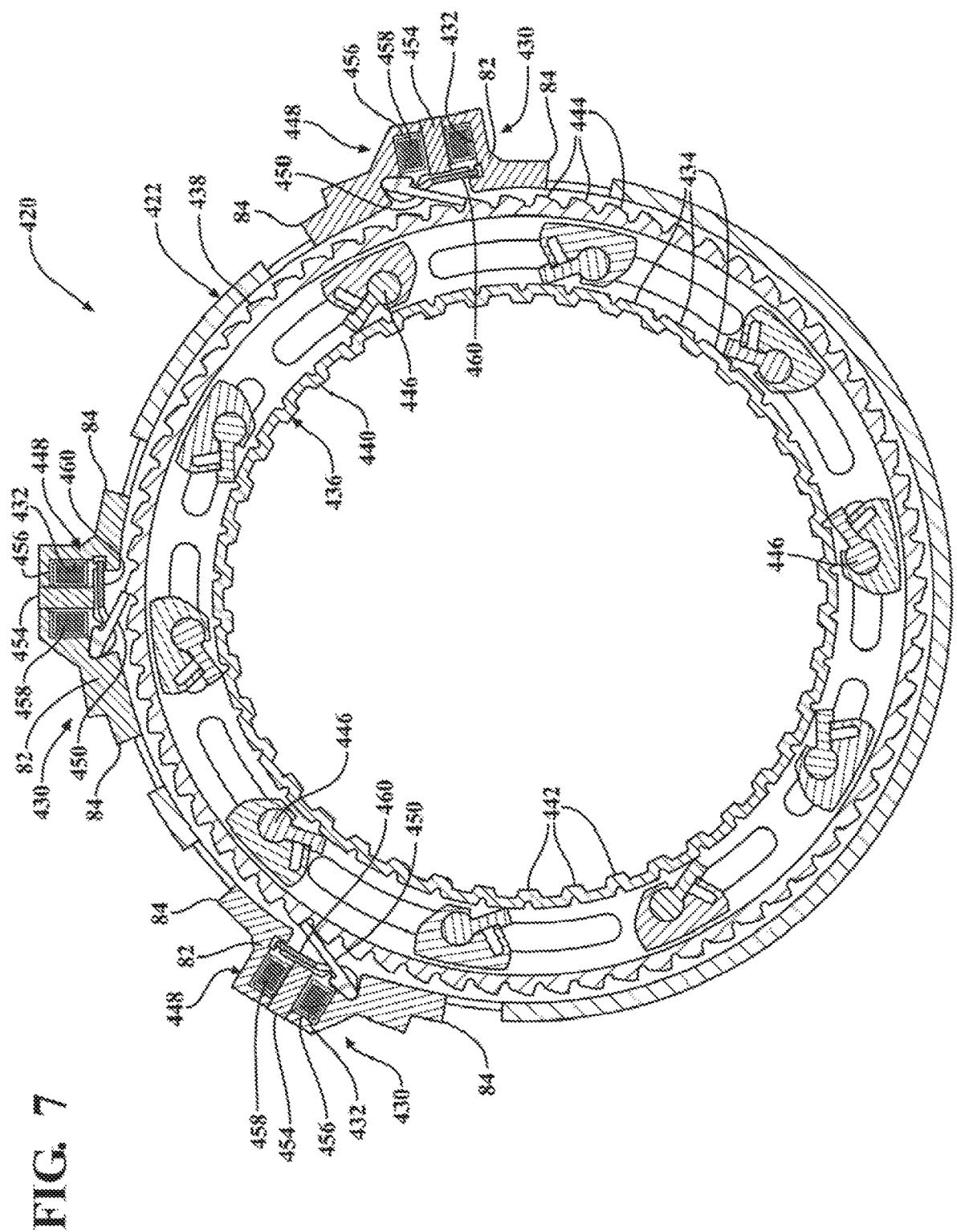
FIG. 7 is a sectional view of the bi-directional clutch assembly shown in FIG. 6.

Referring to FIGS. 6 and 7, wherein like numerals indicate corresponding parts throughout the several views, offset by a factor of 400, a clutch assembly 420 is generally shown. The clutch assembly 420 includes an outer race 422 that extends annularly about an axis A. The outer race 422 includes an outer ring 424 that presents a plurality of outer lugs 428 that extend radially outwardly for mating with a first component. The first component can be a stationary component (such as a housing of a transmission) or a rotary component (such as a shaft). The outer race 422 further has an axially facing web or face 427 that has an annular shape that extends radially inwardly from the outer ring 424. A plurality of passive struts 446 are pivotally connected to the axial face 427. A biasing spring (not shown) engages each of the passive struts 446 for biasing the passive struts 446 in a locked position toward an inner race 436.

The inner race 436 extends annularly about the axis A. The inner race 436 has an outside rim or band 438 and an inside rim or band 440 that are spaced radially from one another on opposing sides of the passive struts 446. The inside band 440 of the inner race 436 presents a plurality of inner lugs 442 that extend radially inwardly therefrom for mating with a second component (typically a rotary component). The inside band 440 of the inner race 436 further presents a plurality of passive teeth 434 that extend radially outwardly therefrom for being engaged by the passive struts 446 for locking the inner and outer races 436, 422 to one another in response to counter-clockwise rotation of the inner race 436 relative to the outer race 422. The outside band 438 of the inner race 436 presents a plurality of active teeth 444 that extend radially outwardly therefrom and are evenly distributed about the axis A.

A plurality of active strut assemblies 448 are axially connected to the outer race 422. Each of the active strut assemblies 448 includes a generally arc shaped protrusion 430, wherein the protrusion 430 is constructed as separate piece of material from the outer race 422. Each protrusion 430 includes a base 82 and a pair of circumferentially extending flanges 84 that extend from the base 82 on opposing sides of the base 82. A fastener 85, e.g., a bolt, extends axially through a through opening in each of the flanges 84 and is fastened to the outer race 422 for securing the active strut assemblies 448 to the outer race 422. The active strut assemblies 448 are arranged in circumferential alignment with one another about the axis A, as desired.

An actuator pocket 432 extends axially into the base 82 of each of the active strut assemblies 448. A coil assembly 452 is disposed in each of the actuator pockets 432. The coil assembly 452 includes a core 454 of a magnetically permeable material, a bobbin 456 configured for receipt about the core 454, and a coil 458 wrapped about the bobbin 456. It should be appreciated that the bobbins 456 and coils 458 of the coil assemblies 452 can advantageously be easily fitted into their respective pockets 432 for easy installation.

Each of the active strut assemblies 448 includes an active strut 450 that is selectively pivotal between a locked and an unlocked position, as discussed above. In the locked position, the active struts 450 engage the active teeth 444 of the inner race 436, therefore locking the outer and inner races 422, 436 to one another during clockwise movement of the inner race 436 relative to the outer race 422. However, the active struts 450 allow relative displacement, i.e., overrun, in the counter-clockwise direction. In the unlocked position, the active struts 450 are radially spaced from the active teeth 444, allowing the outer and inner races 422, 436 to rotate relative to one another.

The plurality of passive struts 446 are pivotal between a locking position and an unlocking position. In the locking position, the passive struts 446 engage the passive teeth 434 of the outer race 422 for connecting the outer and inner races 422, 436 to one another during counter-clockwise rotation of the inner race 436 relative to the outer race 422. Therefore, engagement by the passive struts 446 prevents relative displacement of the outer and inner races 422, 436 in the counter-clockwise direction, however, the passive struts 446 allow relative displacement, i.e., overrun, in the clockwise direction. In the unlocking position, the passive struts 446 are radially space from the passive teeth 434 of the outer race 422, thereby allowing counter-clockwise rotation of the inner race 436 relative to the outer race 422.

Each of the active strut assemblies 448 further includes an armature 460 disposed between the active strut 450 and the core 454 for providing the pivotal movement of the active strut 450 in response to energization of the coil 458. A lead frame 462, such as discussed above with regard to FIGS. 1 and 2, electrically connects the coils 458 to one another for energizing the coils 458 to actuate and pivot the active struts 450 to their engaged, locked positions.

Accordingly, it should be appreciated that the modular configuration of the active strut assemblies/coil assemblies 448, 452 allows the active strut assemblies/coil assemblies 448, 452 to be manufactured separately from the rest of the clutch assembly 420. Further, it should be appreciated that any number of the active strut assemblies/coil assemblies 448, 452 could be installed on any given clutch assembly 420 as needed to provide a needed amount of torque. Additionally, it should be appreciated that the modular active strut assemblies as described herein could be utilized on various other clutch assembly configurations.

It should be appreciated that being able to axially or radially load the coil assemblies 52, 152, 252, 352, 452 discussed above provides for a simple manufacturing assembly step and allows the coil assembly 52, 152, 252, 352, 452 to be assembled before being installed into the respective actuator pocket 32, 132, 232, 332, 432. It should further be appreciated that the aforementioned axially and radially loading pockets/protrusions could be utilized on other clutch assembly configurations.

Figure 8:
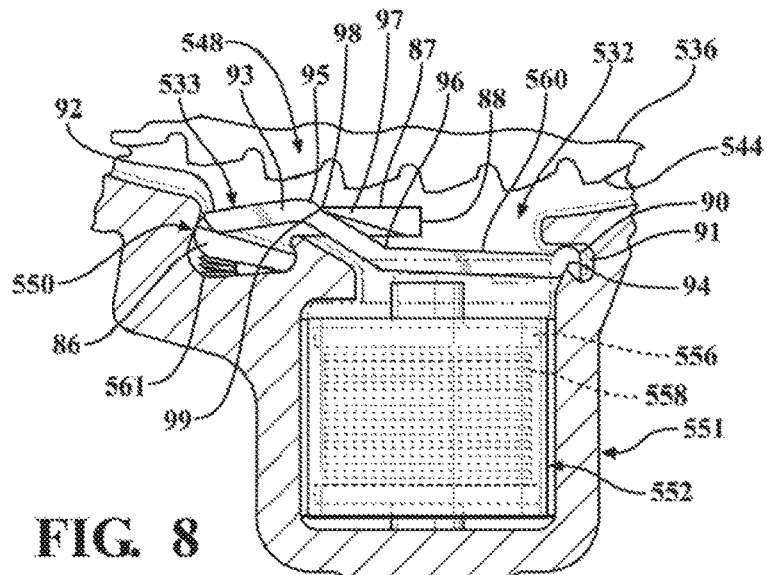
FIG. 8 is an enlarged partial side view of an active strut assembly adapted for use with the selectable one-way clutch associated with the bi-directional clutch assemblies of FIG. 1 and illustrating the active strut in an unlocked position when the electromagnetic actuator is non-energized.
Figure 9:
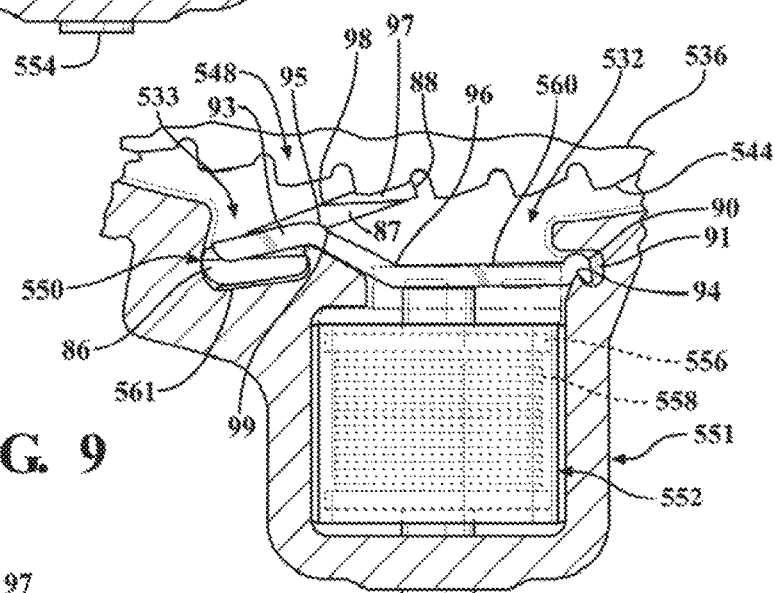
FIG. 9 is similar to FIG. 8 illustrating the active strut located in a locked position in response to energization of the electromagnetic actuator.
Figure 10:
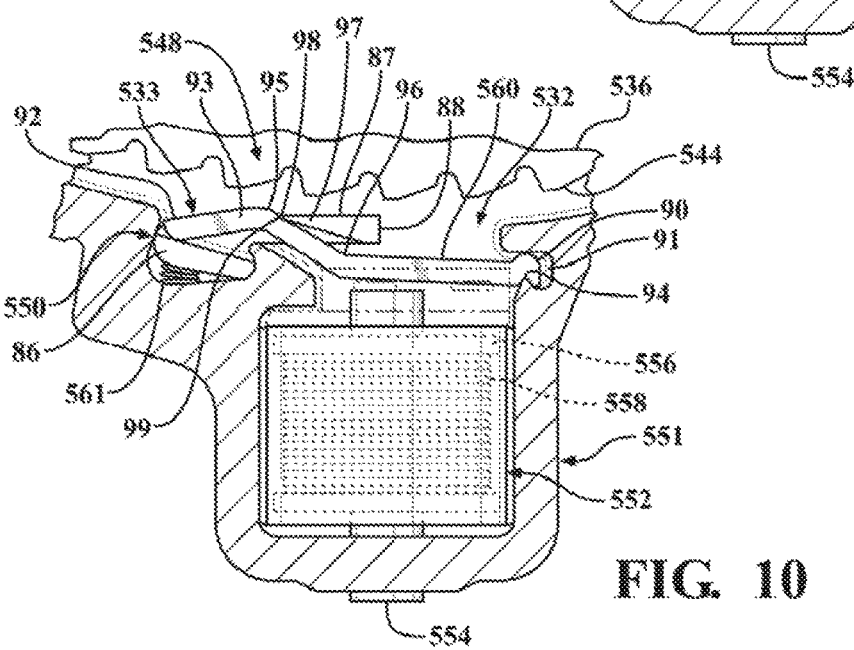
FIG. 10 is similar to FIG. 8 illustrating an inertia load resistance arrangement positively holding the active strut in its unlocked position upon application of a radially directed high inertial load.
Figure 11:
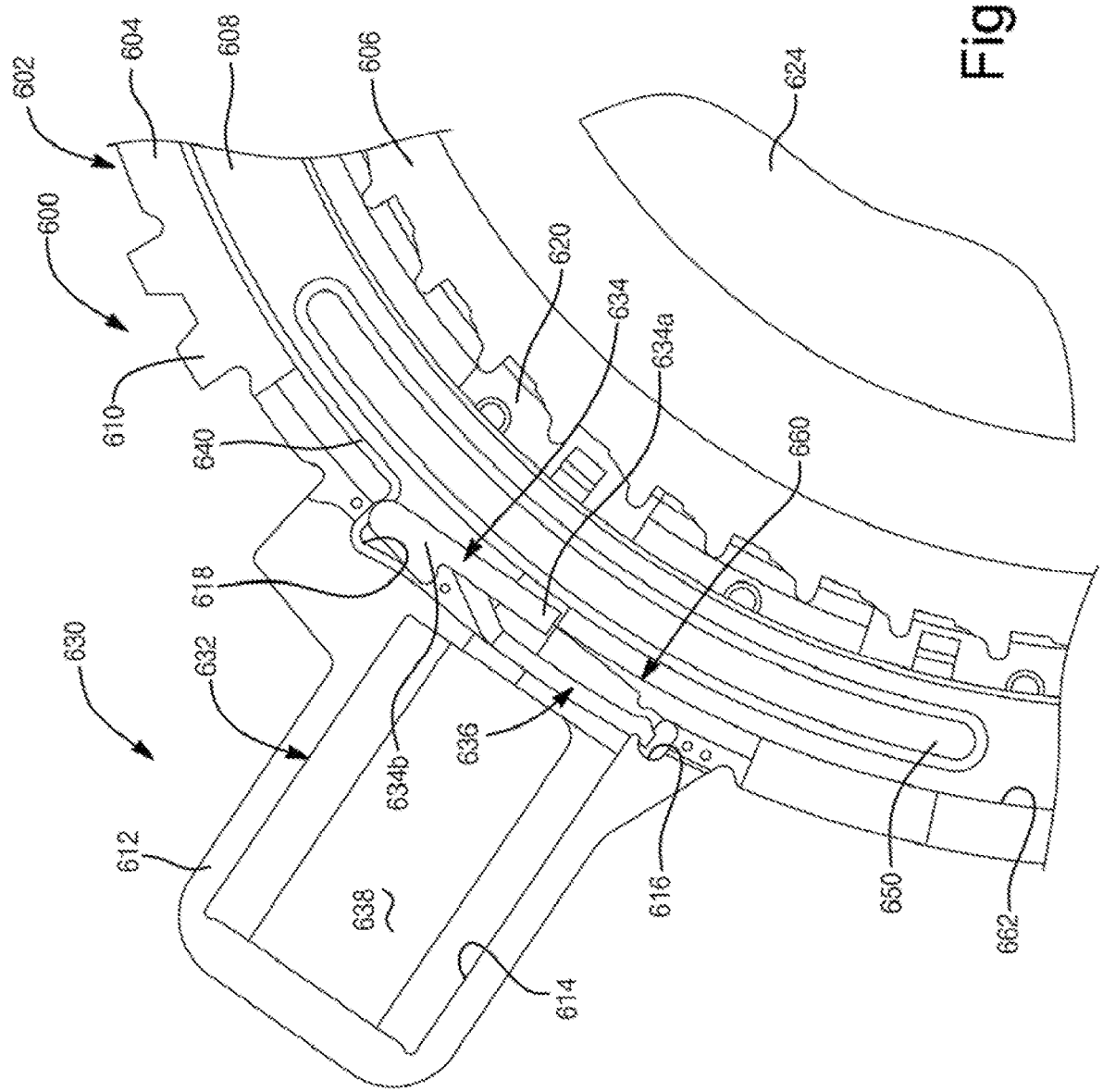
FIG. 11 is an enlarged partial view of an active strut assembly adapted for use with any of the controllable one-way clutches associated with any of the previously disclosed clutch assemblies of the present disclosure and which is configured to provide one or more hydraulic deployment prevention features.

Referring to FIGS. 8-10, wherein like numerals indicate corresponding parts throughout the several views, offset by a factor of 500, an active strut assembly 548, which can be incorporated in any of the clutch assembly embodiments discussed herein, as well as others, as will be readily apparent to one skilled in the art, is received in a strut pocket 533 of the outer race 522. Each of the active strut assemblies 548 is operable via actuation of an electromagnetic actuator 551 having a coil assembly 552, an armature 560, a biasing spring 561, and an active strut 550.

The active strut 550 includes a base segment 86 and a locking arm 87. The locking arm 87 extends from the base segment 86 to a locking end or edge 88. The base segment 86 is pivotally disposed in the strut pocket 533 for pivoting movement between a locked position (FIG. 9) and an unlocked position (FIGS. 8 and 10). In the locked position, the locking edge 88 engages the outer ratchet teeth 544 of the inner race 536, and in the unlocked position, the locking edges 88 are radially spaced from the outer ratchet teeth 544 of the inner race 536. The biasing spring 561 is disposed in the strut pocket 533 and extends between the base segment 86 and a base or floor of the strut pocket 533 for biasing the active strut 550 toward the unlocked position.

The coil assembly 552 includes a core 554 of a magnetically permeable material that is disposed through a central passage of a bobbin 556, with at least one coil 558 being wrapped directly onto the bobbin 556, and thus, operably about the core 554 for focusing the magnetic flux produced by the coil 558 about the core 554.

The armature 560 extends between a first end 90 that is seated in an armature section 91 of the actuator pocket 532 for pivotal movement therein and a second end 92 that extends into the strut pocket 533 into engagement with the base 86 of the active strut 550. The armature 560 is shown as having bifurcated legs 93 forming a channel therebetween, wherein the channel is sized for clearance receipt of a reduced width section of the active strut 550 therein, with each leg 93 extends along opposite sides of the active strut 550. The first end 90 of the armature 560 is pivotally disposed about a pivot rail 94 in the armature section 91 of the pocket 532 for pivoting radially toward and away from the core 554, in response to energization of the coil 558, between an actuated position and a non-actuated position. In the actuated position, the armature 560 is drawn toward the core 554, whereupon the legs 93 drive the active strut 550 into the locked position via engagement with the base segment 86. In the non-actuated position, the armature 560 is spaced from the core 554 and allows the biasing spring 561 to bias the active strut 550 into the unlocked position. The armature 560 presents an upper bend 95 in each leg 92 and a lower bend 96 adjacent an attachment region of the legs 92, such that the upper and lower bends 95, 96 are between the first end 90 and the second end 92.

It is important, especially when the clutch assembly 520 is utilized on automotive components, for the active struts 550 to only engage the outer ratchet teeth 544 of the inner race 536 when then coil assembly 552 is energized to intentionally move the active struts 550 to the locked position. Therefore, resistance to inertia loading (high g-force in certain directions other than simple gravity) is important for the operation of the clutch assembly 520. The most common method of resisting high inertia loading is to utilize a higher force biasing spring 561. While this method is a quick fix, there are disadvantages associated therewith. One of the disadvantages is the increased resistance provided by the biasing spring 561 during normal operation, which requires the armature 560 and/or coil assembly 552 to be increased in size and thickness to produce the necessary increased magnetic forces to overcome the increase in spring force imparted by the larger spring 561. To accommodate such larger components, the pockets 532, 533 may also need to be larger, thereby increasing the overall size and weight of the clutch assembly 520.

As an alternative solution to increasing the size of the aforementioned components/assemblies, the generally central portion of the active strut 550 that extends between the legs 93 of the armature 560 includes a projections 97 that have a generally triangular shaped cross-section that extends lengthwise along a portion of the locking arm 87, with the projections 97 extending outwardly from the central portion of the locking arm 87 away from one another into overlying relation with a respective leg 93. Each of the projections 97 converges and terminates at a generally sharp edge 98. Further, a shoulder 99 is defined by or provided adjacent the upper bend 95 in the legs 92 of the armature 560. The shoulders 99 are configured to be engaged by the edges 98 of the projections 97 of the active strut 550 for restricting the strut 550 against movement toward the locked direction, unless otherwise actuated via energization of the coil assembly 552. Thus, during the application of inertial forces, the purposeful engagement of the projections 97 with the shoulders 99 causes the strut 550 to stop rotating upwardly, thereby preventing engagement of the outer ratchet teeth 544 of the inner race 536 with the locking edge 88 of the active strut 550 (as best shown in FIG. 10).

FIG. 8 presents a non-energized position of the coil 558, with the active strut 550 in the unlocked position. Further, FIG. 9 presents an energized position of the coil 558, causing the active strut 550 to be pivoted to the locked position, as intended. FIG. 10 shows the situation in which a high inertial load is applied to the clutch assembly 520 in the radial inward direction (as shown by the arrow). In this situation the armature 560 rotates clockwise slightly under the inertial load, however, the active strut 550 is blocked and prevented from rotating counter-clockwise any further due to the intentional interference established between the abutting shoulder 99 of the armature 560 and the locking edges 98 of the projections 97. Therefore, the interference between the edges 88 of the projections 97 and the shoulders 99 of the armature 560 greatly increase the force required to move the active strut 550 against the outer ratchet teeth 544 of the inner race 536, but doesn't increase the amount of load required by the armature 560/coil assembly 552 to pivot the active strut 550, as commanded and intended.

It should be appreciated that the projections 97 of the struts 550 and shoulders 99 of the armature 560 could be utilized on other active strut assembly configurations to resist high inertia loading.

Referring now to FIGS. 11-14, a clutch assembly 600 is generally shown to be a modified version applicable to each of bi-directional clutch assemblies 20 (FIGS. 1-3), 120 (FIG. 4), 200 (FIG. 5A), 300 (FIG. 5B), 420 (FIGS. 6-7) and 520 (FIGS. 8-10), and particularly to the controllable one-way clutch associated with each alternative embodiment. In particular, clutch assembly 600 includes a controllable one-way clutch integrating a number of deployment preventing features that are directed to addressing and minimizing/inhibiting the unintended deployment of the active strut as a result of hydraulic effects acting thereon due to fluid within the transmission and/or clutch assembly 600. However, the hydraulic deployment preventing features to be described hereinafter are also applicable to passive one-way clutches for the same purpose and those skilled in the art will recognize the ability to readily integrate these features into any strut-type or rocker-type one-way clutch. Likewise, while each of the above clutch assemblies includes an active strut assembly configured to use an armature to deploy the active struts upon actuation of the electromagnetic actuator, the hydraulic deployment prevention features of the present disclosure are equally applicable to controllable one-way clutches having "direct" strut actuation configurations as well as being equally applicable to other types of moveable locking elements used in place of struts.

Clutch assembly 600 includes a clutch module having an outer race 602 and an inner race 624. Outer race 602 extends about an axis A and includes an outer ring segment 604, an inner ring segment 606, and a plate segment 608 therebetween. Lugs 610 formed on outer ring segment 604 are provided for mating with a first component. As noted, the first component can be a stationary transmission housing or a rotary component such as a shaft. Outer ring segment 604 also includes one or more actuator bosses 612 defining an actuator pocket 614, an armature pocket 616, and a strut pocket 618. Finally, inner ring segment 606 includes a plurality of ramped inner ratchet teeth 620 which extend inwardly and are evenly distributed about the A axis.

While only schematically shown, inner race 624 also extends about the A axis. Inner race 624 of clutch assembly 600 is understood to be generally similar in structure and function to inner ring 36 of clutch assembly 20. Thus, inner race 624 has an outer rim segment disposed radially between outer and inner ring segments 604, 606 of outer race 602, and an inner rim segment disposed radially inwardly from inner ring segment 606 of outer race 602. The inner rim segment of inner race 624 has inner torque transfer structures (i.e. lugs or splines) for mating engagement with the second component. Finally, the outer rim segment of inner race 624 includes a plurality of ramped outer ratchet teeth that extend radially outwardly and are evenly distributed about the A axis.

A passive one-way clutch (not shown) is associated with clutch assembly 600 and again includes a plurality of passive struts pivotably supported by inner race 624. The passive struts are moveable for engaging inner ratchet teeth 620 on inner ring segment 606 of outer race 602. As before, the passive struts are configured to engage inner ratchet teeth 620 to prevent relative rotation between outer race 602 and inner race 624 in a first (locking) direction while allowing relative rotation therebetween in a second (freewheeling) direction.

The controllable one-way clutch 630, associated with bi-directional clutch assembly 600, includes at least one electromagnetic actuator module, each received in a corresponding actuator boss 612 in outer race 602. Each electromagnetic actuator module includes an active strut assembly 632 and an electromagnetic actuator 638. Each active strut assembly 632 includes an active strut 634 and an armature 636. Again, each active strut 634 is pivotably supported in strut pocket 618 for movement between a locked (deployed) and an unlocked (non-deployed) position with respect to the ramped outer ratchet teeth formed on the outer rim segment of inner race 624. In the locked position, an engagement end 634a of active struts 634 has pivoted to a position relative to outer race 602 so as to engage the outer ratchet teeth on inner race 624 to establish the locked clutch mode. In contrast, the engagement end of 634a of active struts 634 is radially displaced and disengaged from the outer ratchet teeth on inner race 624 when located in their unlocked position so as to establish the unlocked clutch mode.

Each armature 636 is pivotably supported in armature pocket 616 of actuator boss 612 and is mechanically connected to a corresponding active strut 634. When armature 636 is located in an attracted or actuated position relative to actuator 638, active strut 634 is located in its deployed position. In contrast, location of armature 636 in an unattracted or non-actuated position relative to actuator 638 results in location of active struts 634 in their non-deployed positions. A return spring 640 is retained by outer race 602 and acts on a tail end 634b of each active strut 634 so as to normally bias active strut 634 toward its non-deployed position which, in turn, biases armature 636 toward an unattracted position. Return spring 640 could alternatively act directly on armature 636. Electromagnetic actuator 638 is supported in actuator pocket 614 of actuator boss 612 and has a coil assembly that is radially spaced from armature 636 and strut 634. As before, the coil assembly includes a core of magnetically permeable material, a bobbin surrounding the core, and a coil winding wrapped about the bobbin. As is known, energization of the coil assembly establishes a magnetic attraction between the core and armature 636 which functions to pivotably move armature 636 from its unattracted position to its attracted position and move active strut 634 from its non-deployed position to its deployed position against the biasing of return spring 646.

In accordance with aspects of the present invention, a number of distinct deployment inhibiting features are associated with at least one of outer race 602, active strut 634 and armature 636. These features are configured to inhibit unintended (i.e. non-energized) deployment of active struts 634 by addressing and counteracting the fluid dynamics and flow characteristics of fluid acting on or around the active strut assemblies 632, cumulatively identified as "hydraulic deployment". Unintended hydraulic deployment is a condition where the strut is moved from its non-deployed position toward its deployed position due to a pressure gradient acting thereon. This pressure gradient, when combined with the fluid dynamics associated with rotation of inner race 624 relative to outer race 602, results in a force vector acting on engagement end 634a of active struts 634. As the hydraulically induced force acting on end 634a of active struts 634 increases, it eventually overcomes the biasing force exerted by return spring 640, thereby resulting in unintended pivotal movement of active struts 634 toward their deployed position while electromagnetic actuator 638 remains non-energized. Thus, clutch assembly 600 acts as an inefficient fluid pump.

One solution to this unwanted pump behavior is to add anti-deployment features which function to either divert or redirect fluid flow from sensitive areas of selectable one-way clutch 630 or to reduce the fluid pressure in other areas, thereby reducing the hydraulic deployment force exerted on active struts 634 generated by fluid movement associated with freewheeling of inner race 624 relative to outer race 602. To this end, several modifications and/or features have been added to the various components of controllable one-way clutch 630. The following description of each feature is in no particular order or relevance or functionality.

In accordance with a first anti-deployment feature, an elongated flow channel 650 is shown formed in plate segment 608 of outer race 602. While flow channel 650 is shown to be aligned along axis A and extend generally symmetrically with respect to a center line of electromagnetic actuator 638, these are merely non-limiting examples used to illustrate one suitable embodiment. Alternatives contemplated include, without limitation, modifying the length of flow channel 650, its symmetry, its depth (constant or variable) and its width. Such variations are all intended to prevent a pressure build or to bleed pressure from the high pressure area to the lower pressure area of clutch 630. Furthermore, this flow channel 650 interferes with fluid travelling radially outwardly toward active strut assembly 632, especially fluid disposed between outer ring segment 604 and inner ring segment 606 of outer race 602.

Figure 14:
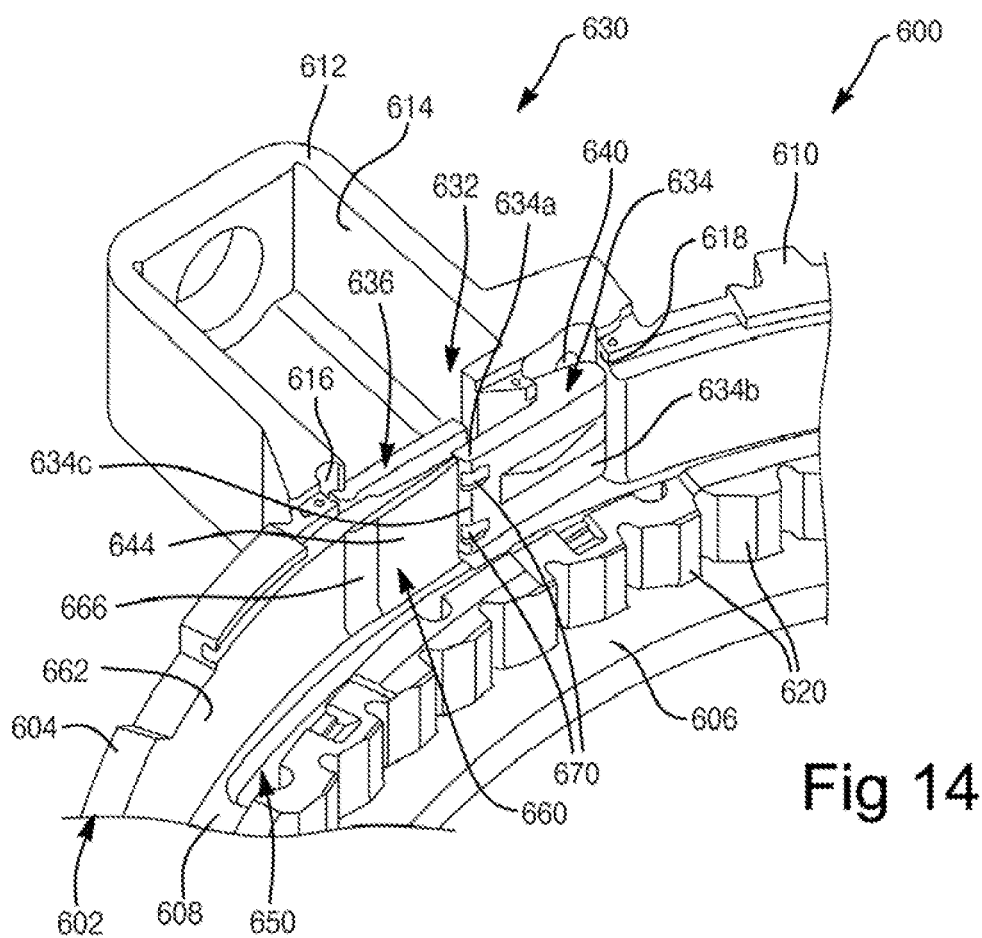
FIG. 14 is an isometric view of the active strut assembly of FIG. 13 showing the combination of all three hydraulic deployment prevention features in greater detail.

In accordance with a second anti-deployment feature, a ramped or flow camming structure 660 is formed on an inner wall surface 662 of outer ring segment 604 of outer race 602. This flow camming structure 660 is best shown in FIG. 14 to include a raised surface segment 664 connected to inner wall surface 662 via a ramped surface segment 666. The length and surface configuration (i.e. arcuate, planar, constant radius or variable) of one or both of raised surface segment 664 and camming surface segment 666 associated with the flow camming structure 660 can be varied. This feature is configured to eliminate a pinch point between inner race 624 and outer race 602 created by a fluid damming effect associated with fluid within and around coil pocket 614 which resulted in localized fluid pressurization near and around active strut 634.

Figure 12:
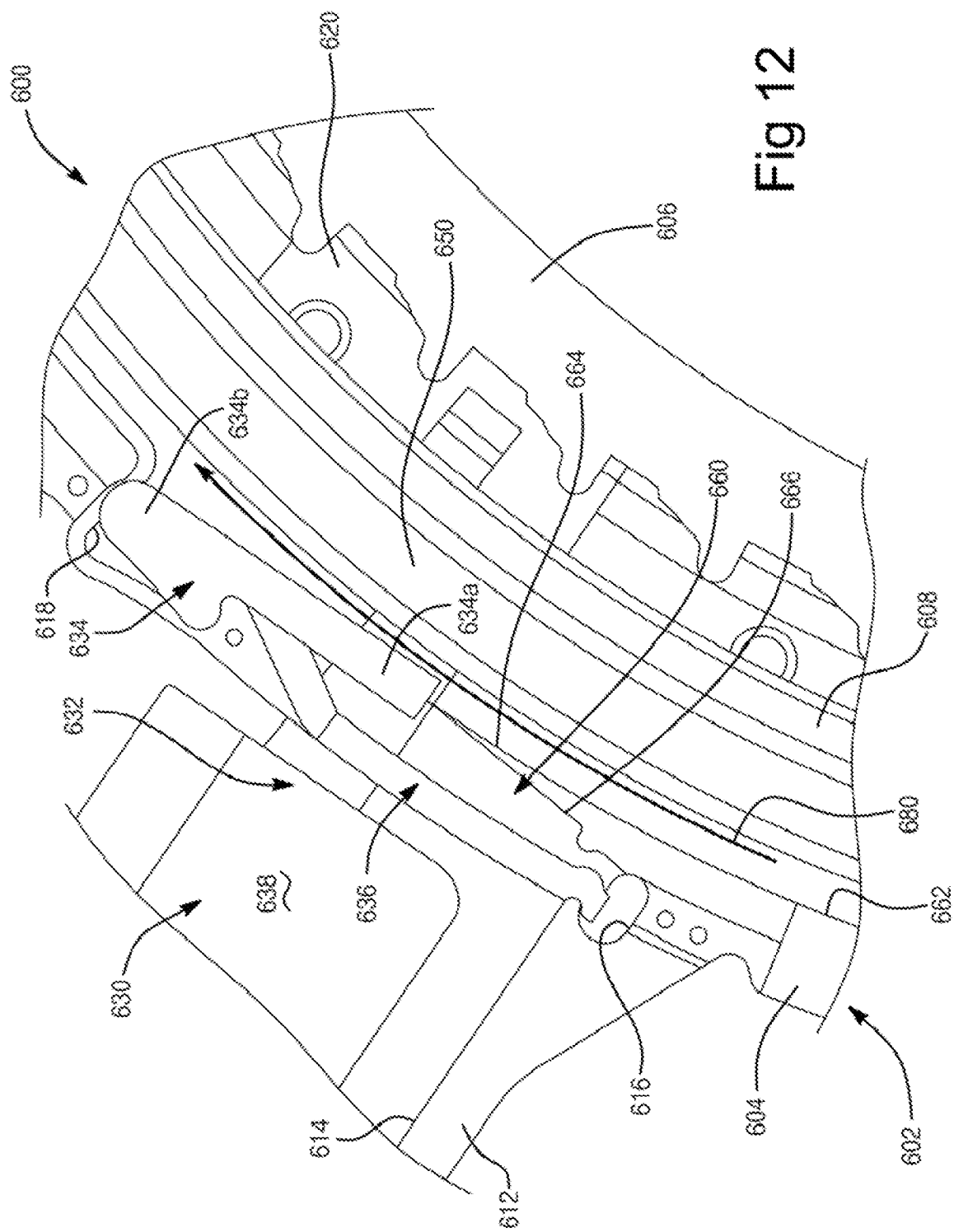
FIG. 12 is an enlarged partial view of FIG. 11 illustrating first and second hydraulic deployment prevention features in greater detail.
Figure 13:
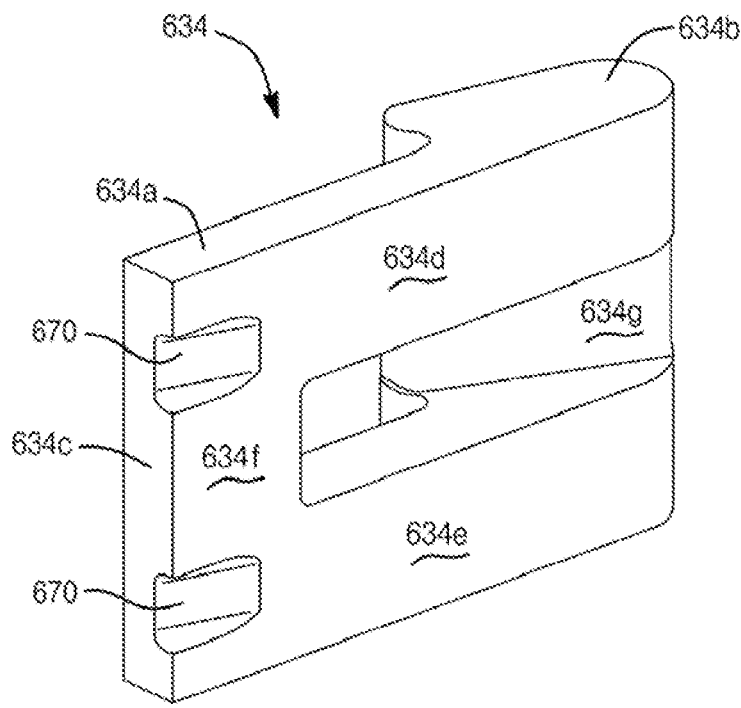
FIG. 13 is an isometric view of the active strut associated with the active strut assembly of FIGS. 11 and 12 illustrating a third hydraulic deployment prevention feature in greater detail.

In accordance with a third anti-deployment feature, one or more flow channels, as referred to as spoilers 670, are formed in edge surface 634c on engagement end 634a of active struts 634. Active strut 634 is best shown in FIGS. 13 and 14 to include a pair of leg sections 634d, 634e connected at engagement end 634a via a cross-rail section 634f and at pivot end 634b via a pivot rail section 634g. FIGS. 13 and 14 show a pair of ramped spoilers 670 having a greatest depth at end surface 634c and converging into leg sections 634d, 634e. The length, width, taper, location, number and/or profile of these flow spoilers 670 can be varied to meet any suitable requirements. In particular, spoilers 670 function to force oil over the tip end 634a of active struts 634 to assist in maintaining active struts 634 in their retracted, non-deployed position. These flow channels in active struts 634 function as spoiler in that they generate a radial fluid force to assist strut return spring 640 in holding active struts 634 in the non-deployed position. FIG. 12 includes an elongated arrow 680 showing that the combination of these three (3) anti-deployment features are configured to redirect the oil flow over the tips of the active struts 634 forcing them toward the coil pocket.

The inventive concepts associated with FIGS. 11-14 are critically important to optimize primary performance of these one-way clutches or rocker clutches and are directed to minimizing susceptibility to unintended hydraulic strut deployment.

Figure 15:
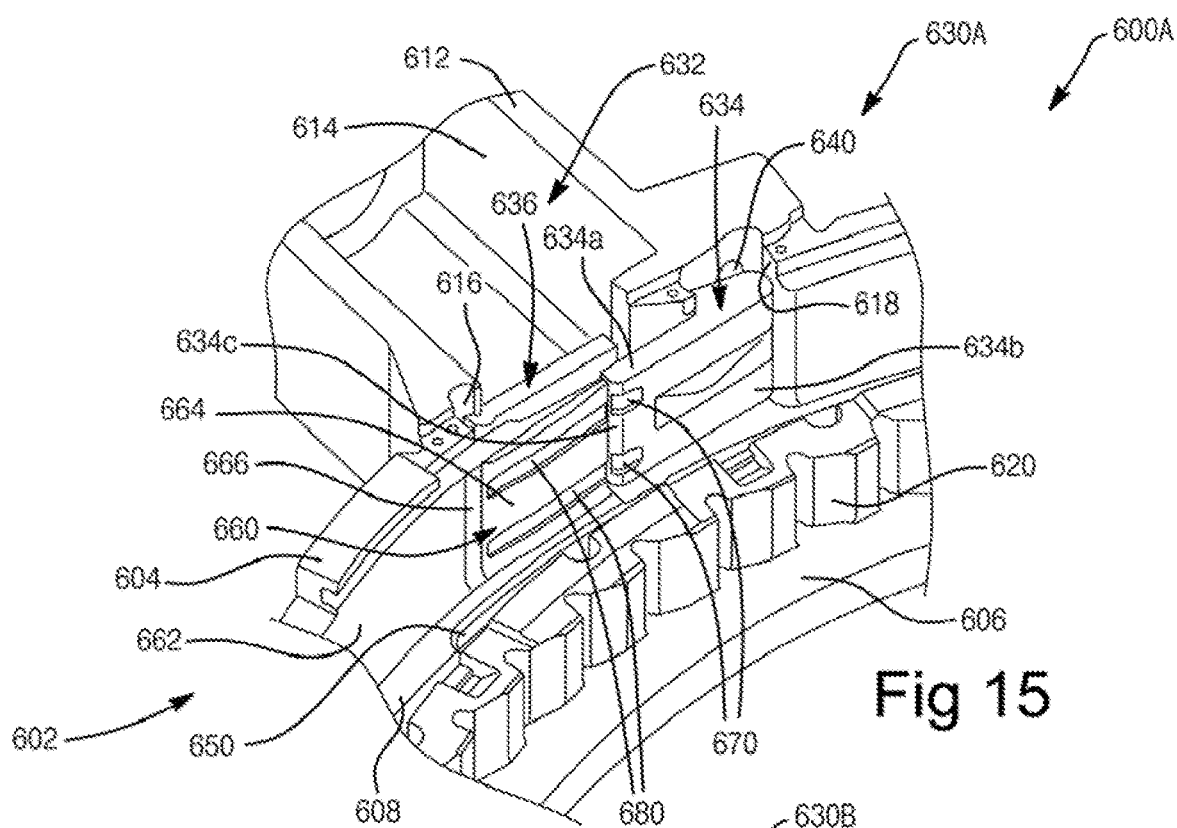
FIG. 15 is another isometric view of the active strut assembly of FIG. 13 showing the three hydraulic deployment prevention features of FIG. 14 now combined with a fourth hydraulic deployment prevention feature.

Referring now to FIG. 15, a clutch assembly 600A is shown to be a slightly modified version of clutch assembly 600 shown in FIGS. 11-14. To this end, clutch assembly 600A includes a controllable one-way clutch 630A integrating a number of deployment preventing features that, as mentioned previously, are directed to minimizing/inhibiting the unintended deployment of the active strut 634 resulting from the hydraulic effects of the fluid acting thereon due to fluid flow within the transmission and/or clutch assembly 600A. Generally speaking, clutch assembly 600A is configured to combine one or more of the three (3) hydraulic anti-deployment features disclosed in association with clutch assembly 600 of FIGS. 11-13 with an additional (hereinafter "fourth") anti-deployment feature. Due to the similarity of most components of clutch assembly 600A to the components detailed previously in association with clutch assembly 600, common reference numerals are used hereinafter to identify the similar components.

The controllable one-way clutch 630A associated with bi-directional clutch assembly 600A includes an active strut assembly 632 received in each actuator boss 612 formed in outer race 602. As before, each active strut assembly 632 includes an active strut 634, an armature 636, and an electromagnetic actuator 638. Each active strut 634 is pivotably supported in strut pocket 618 for movement between its locked (deployed) and unlocked (non-deployed) positions with respect to ramped outer ratchet teeth formed on the outer rim segment of inner race 624. As seen, controllable one-way clutch 630A is shown, in this non-limiting embodiment, to include: (a) the first anti-deployment feature noted above which is configured as elongated flow channel 650 formed in plate segment 608 of outer race 602; (b) the second anti-deployment feature noted above which is configured as ramped camming structure 660 formed on outer ring segment 604 of outer race 602; and (c) the third anti-deployment feature noted above which is configured as a pair of flow channels or "spoilers" 670 formed in edge surface 634c on engagement end 634a of active struts 634. As previously noted, the specific dimensions of each of these anti-deployment features can be modified to meet particular fluid flow and deployment requirements associated with clutch assembly 600A.

In accordance with the fourth anti-deployment feature, FIG. 15 illustrates a pair of elongated flow channels 680 formed in camming structure 660 and which are aligned with spoilers 670 formed in active struts 634. Flow channels 680 are provided to optimize the directed flow of fluid into spoilers 670 so as to increase the force exerted on tip segment 634a of active struts 634 which, in turn, urges active struts 634 toward their non-deployed position. The length, width and depth of flow channels 680 can be varied, as well as the profile (i.e. rectangular or cylindrical) thereof, to provide optimized directed flow of fluid into spoilers 670. While both flow channels 680 are shown to be identical in configuration, the present embodiment contemplates alternative arrangements employing non-identical configurations for flow channels 680.

Figure 16:
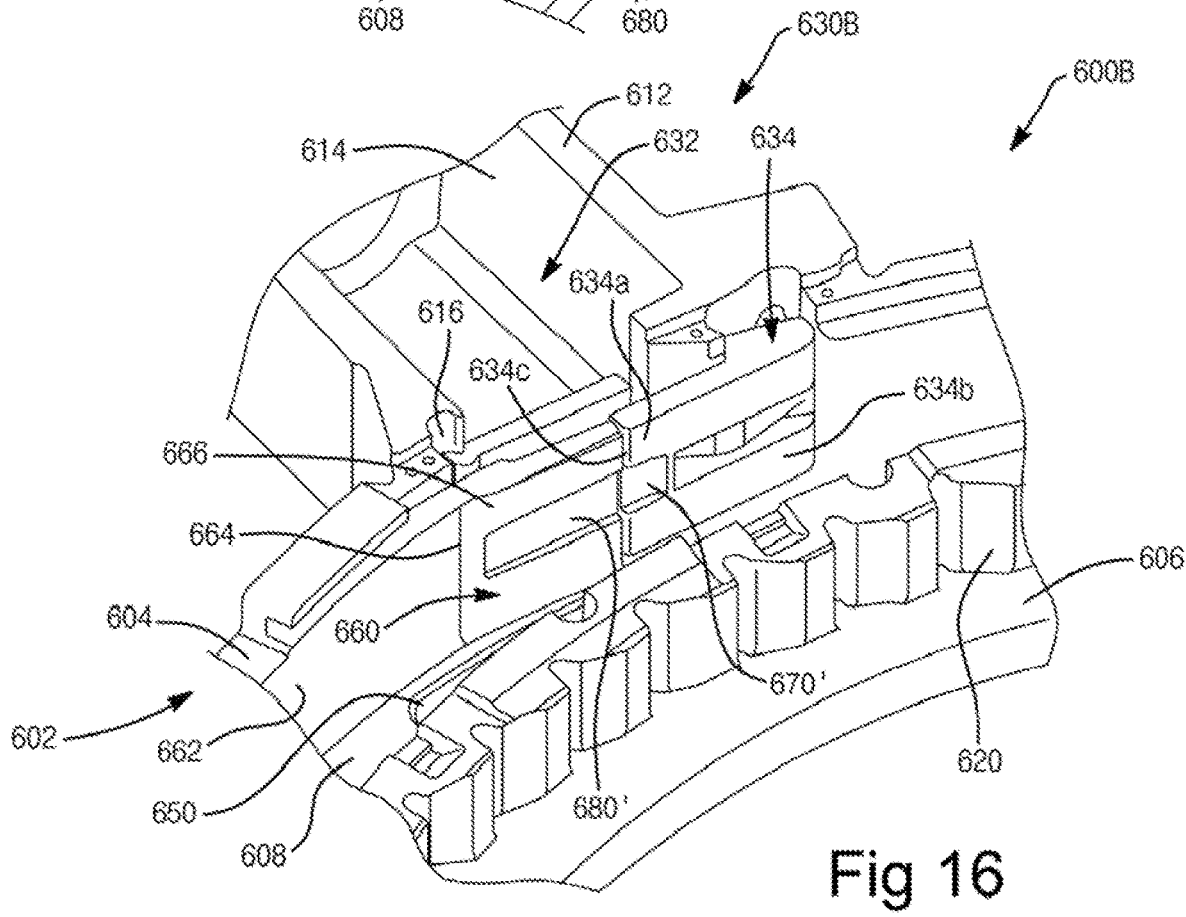
FIG. 16 is yet another isometric view of the active strut assembly of FIG. 13 illustrating an alternative configuration for the fourth hydraulic deployment prevention feature shown in FIG. 15.

FIG. 16 illustrates another version of a bi-directional clutch assembly 600B having a controllable one-way clutch 630B that is generally similar to one-way clutch 630A of bi-directional clutch assembly 600A of FIG. 15, with the exception that a single flow channel 680' is formed in ramped camming structure 660 which is aligned with a single spoiler 670' formed in active strut 634. As before, the use of this fourth anti-deployment feature in cooperation with the second anti-deployment feature (ramped camming structure 660) and the third anti-deployment feature (spoiler 670') promotes enhanced/increased fluid flow specifically directed to end segment 634a of active struts 634 to assist in maintaining active struts 634 in their unlocked/non-deployed position. Note that clutch assembly 600B is also configured to include the first anti-deployment feature comprising flow channel 650.

Again, to reiterate, the hydraulic anti-deployment features disclosed herein find application to both passively and actively-controlled one-way clutches, alone or bundled in bi-directional arrangements. These anti-deployment arrangements are also adaptable to both radially-stacked and axially-aligned versions of such one-way clutches. Finally, these features are applicable with both direct-strut and indirect-strut actuation types of controllable one-way clutches.

Referring now to FIGS. 17 through 24, yet another alternative embodiment of a clutch assembly 700 is shown to generally include a clutch module 702, an electromagnetic actuator module 704, a passive one-way clutch 706, and a controllable one-way clutch 708. Clutch module 702 includes an outer race 710 and an inner race 712.

Figure 17A:
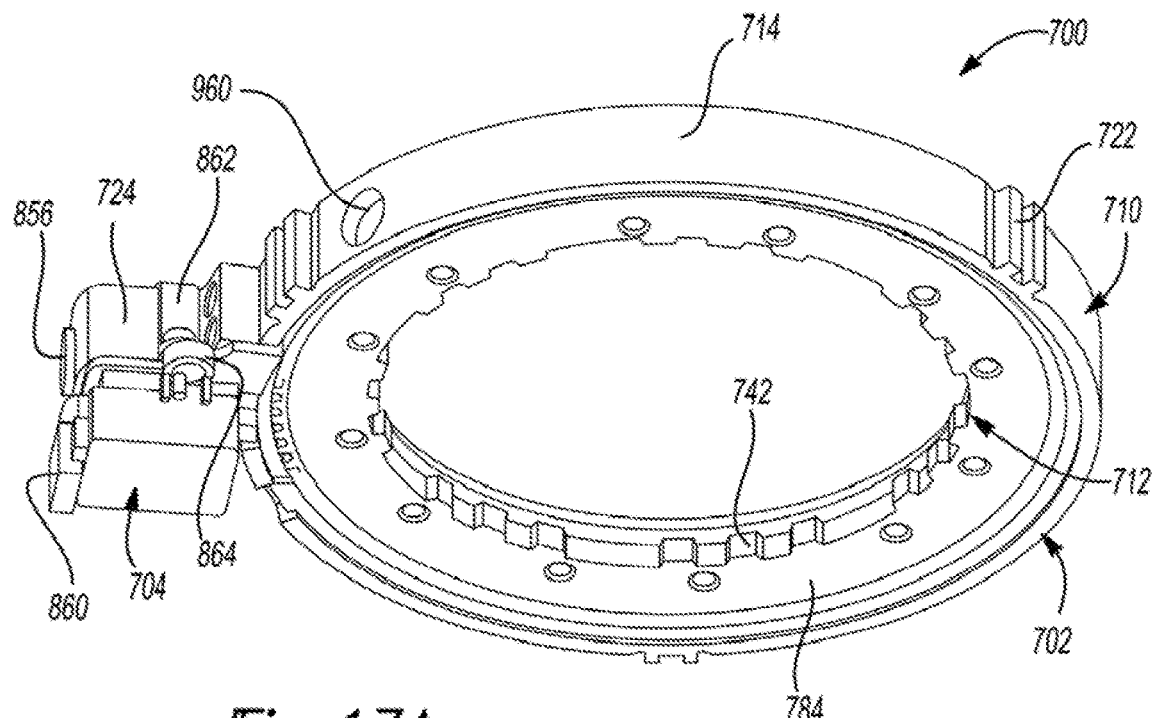
FIGS. 17A and 17B are front and back isometric views of a clutch assembly including a passive one-way clutch and a controllable one-way clutch having a clutch module and an electromagnetic actuator module.
Figure 17B:
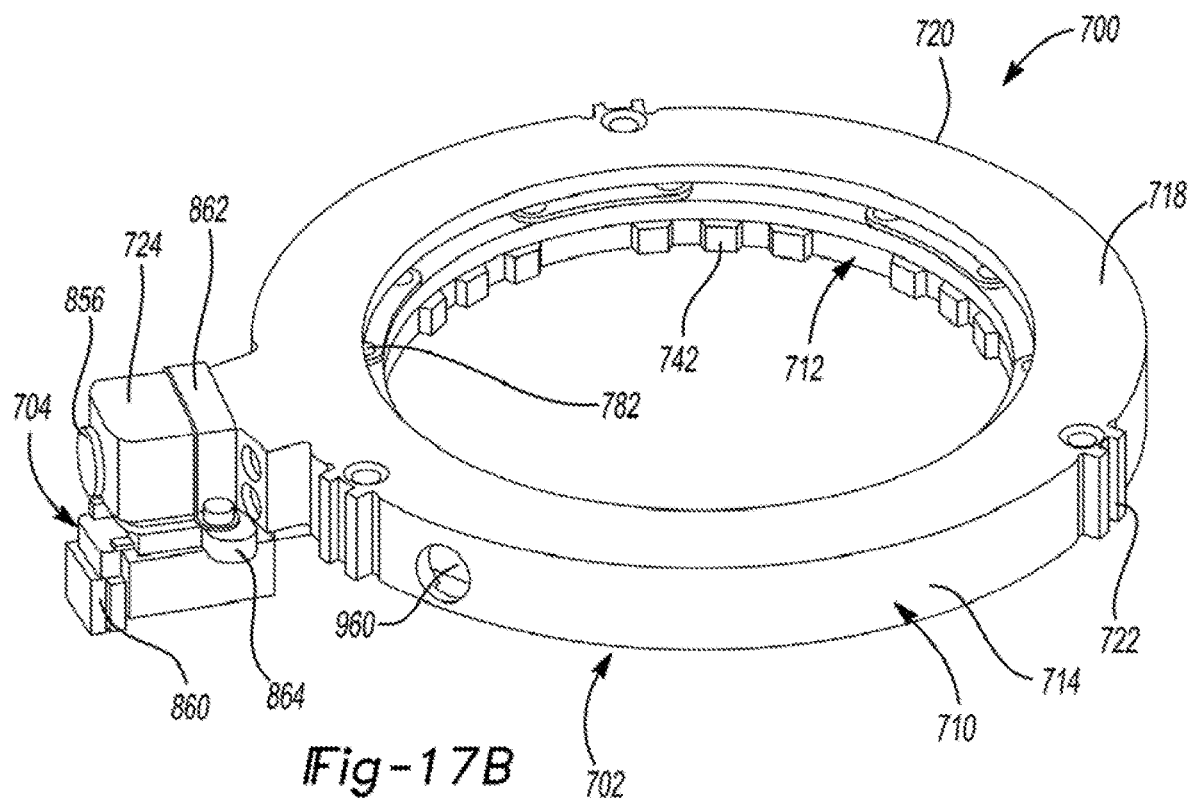
Figure 18A:
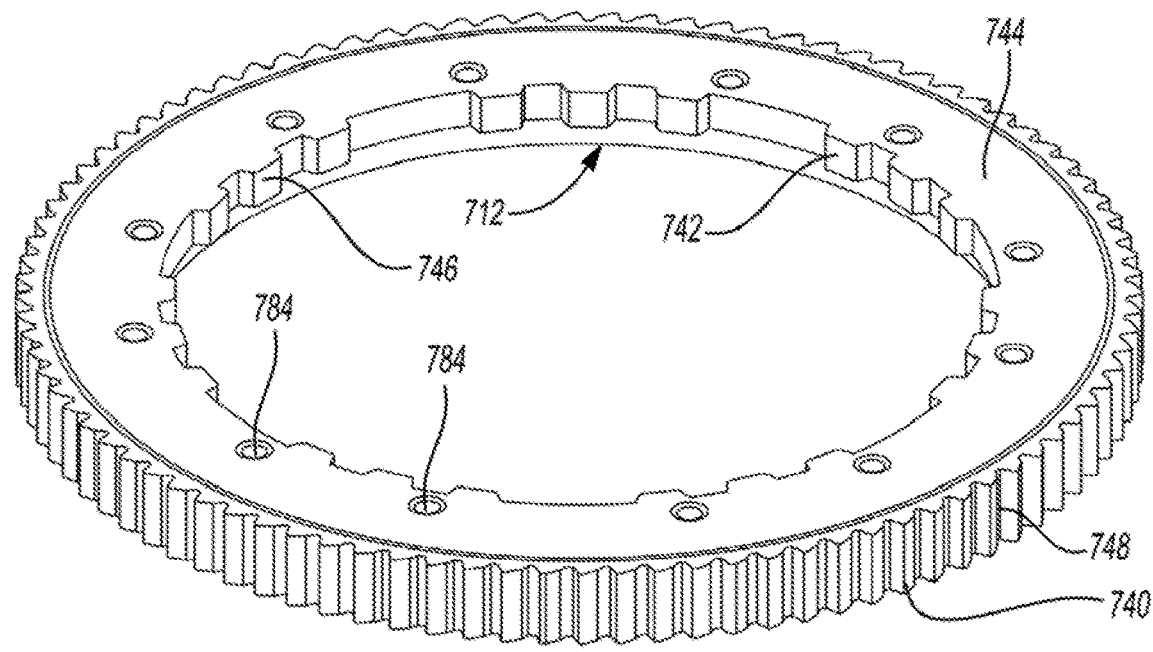
Figure 18B:
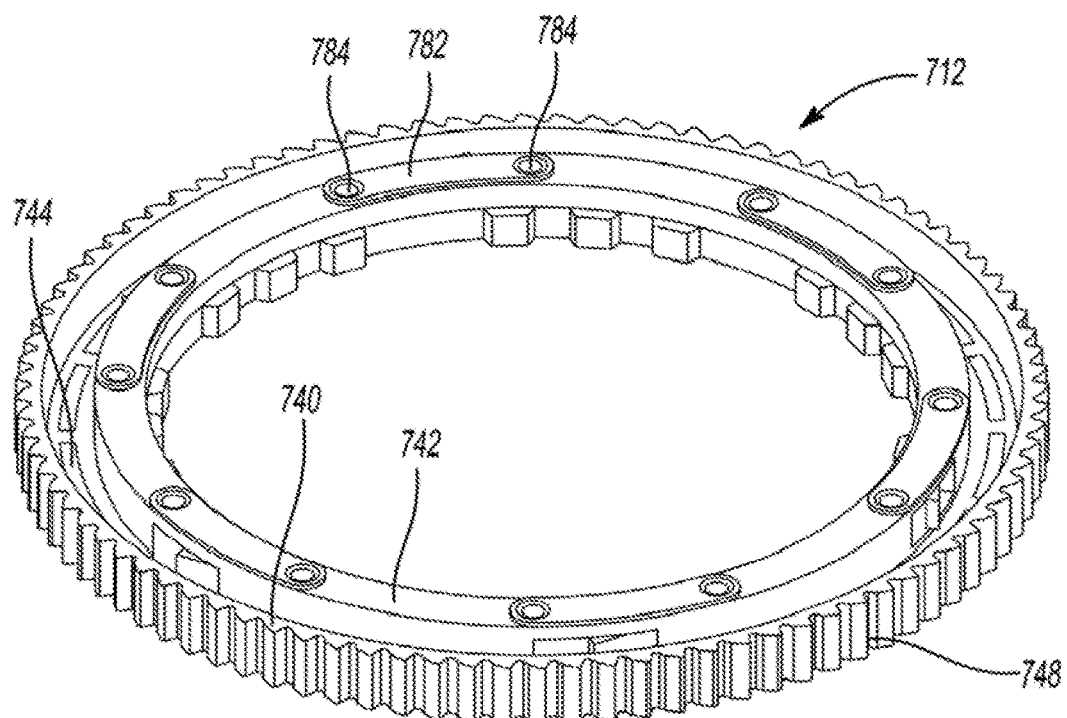
Figure 18C:
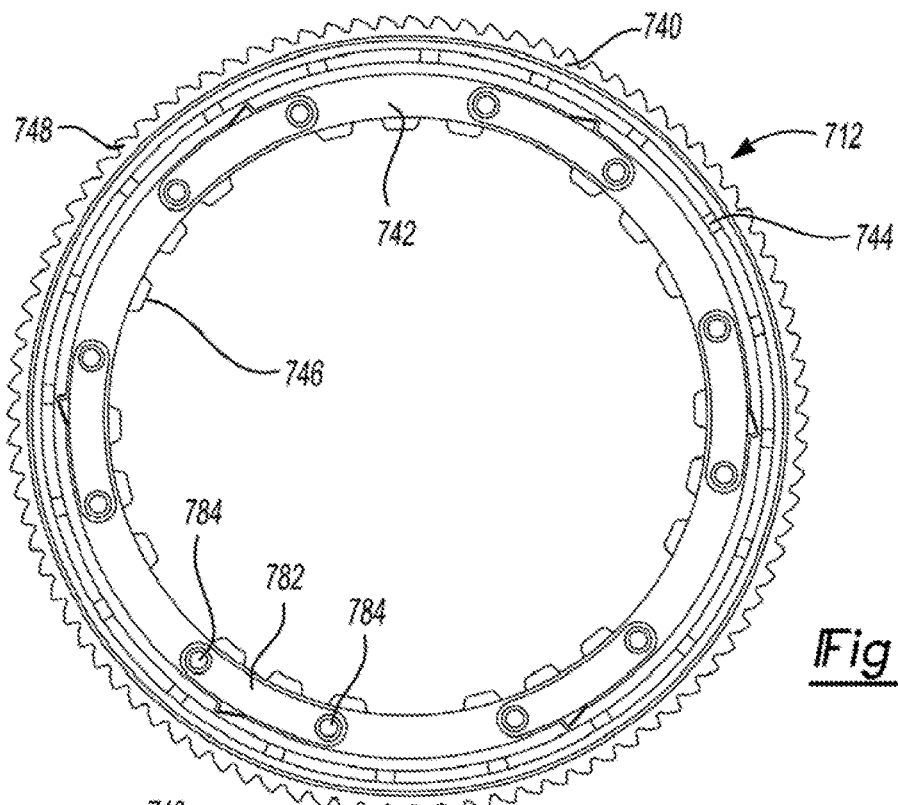
Figure 18D:
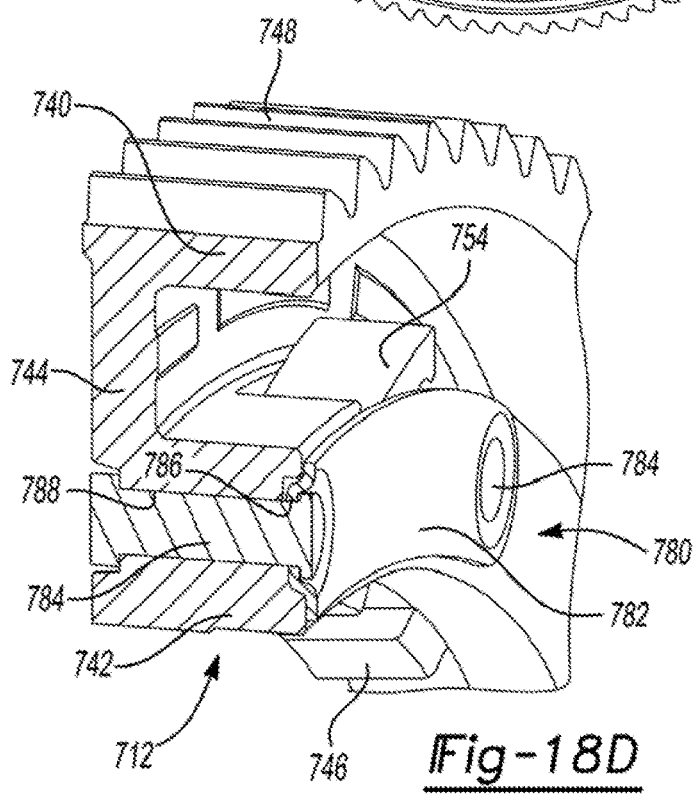
FIG. 18D is a partial isometric view of retainer plates shown in FIG. 18E installed on the inner race to enclose the passive strut assemblies supported thereon.
Figure 18E:
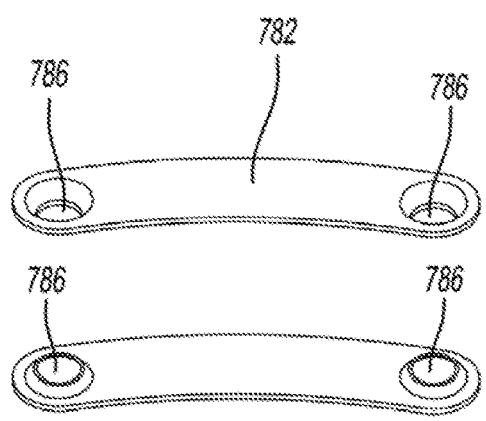

Outer race 710 includes an outer ring segment 714, an inner ring segment 716, and a plate segment 718 therebetween. A backing plate 720 is secured to a backside of outer race 710, as best shown in FIG. 17B. Lugs 722 formed on outer ring segment 714 are provided for mating engagement with a first component previously noted to include either a stationary (transmission housing) component or a rotary (shaft) component. An actuator boss 724 is formed on outer ring segment 714 of outer race 710 and defines an actuator pocket 726, an armature pocket 728, and a strut pocket 730. Inner ring segment 716 includes a plurality of ramped inner ratchet teeth 732 (FIGS. 19A, 19B).

Inner race 712, as best shown in FIG. 17A and FIGS. 18A-18D, is configured to include an outer rim segment 740, an inner rim segment 742 and a plate segment 744 therebetween. Outer rim segment 740 is configured to be radially disposed between outer ring segment 714 and inner ring segment 716 of outer race 710. Likewise, inner rim segment 742 is configured to be disposed radially inwardly from inner ring segment 716 of outer race 710. Inner rim segment 742 has inner torque transfer structures, such as lugs 746 for mating engagement with the second component. Finally, outer rim segment 740 is formed to include a plurality of ramped outer ratchet teeth 748.

Figure 19A:
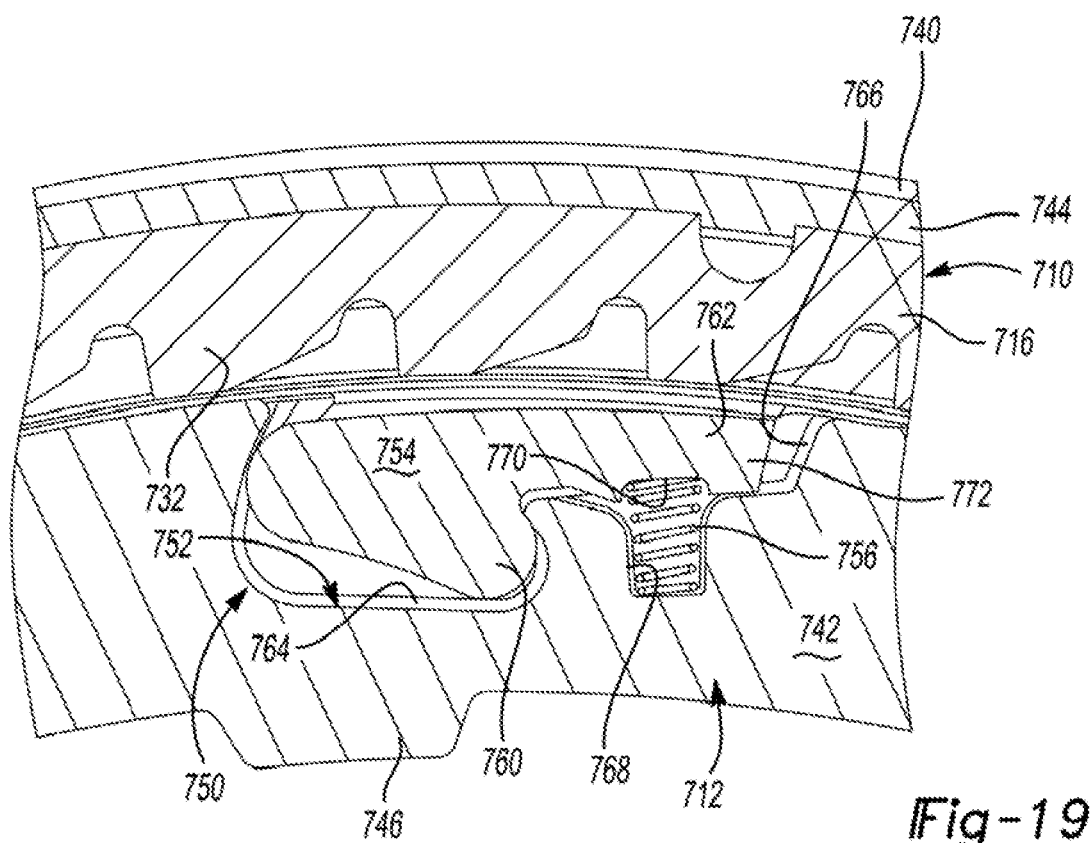
FIGS. 19A-19B are partial plan views of the controllable one-way clutch assembly shown in FIGS. 17A and 17B illustrating the passive strut assembly respectively in non-deployed and deployed states.
Figure 19B:
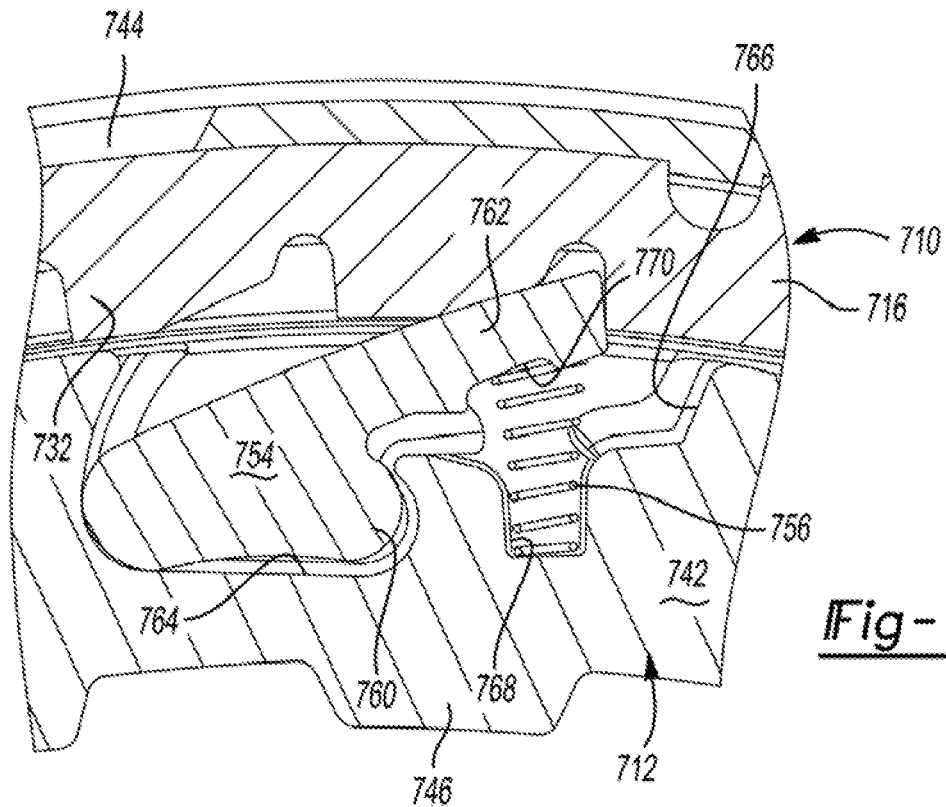
Figure 20A:
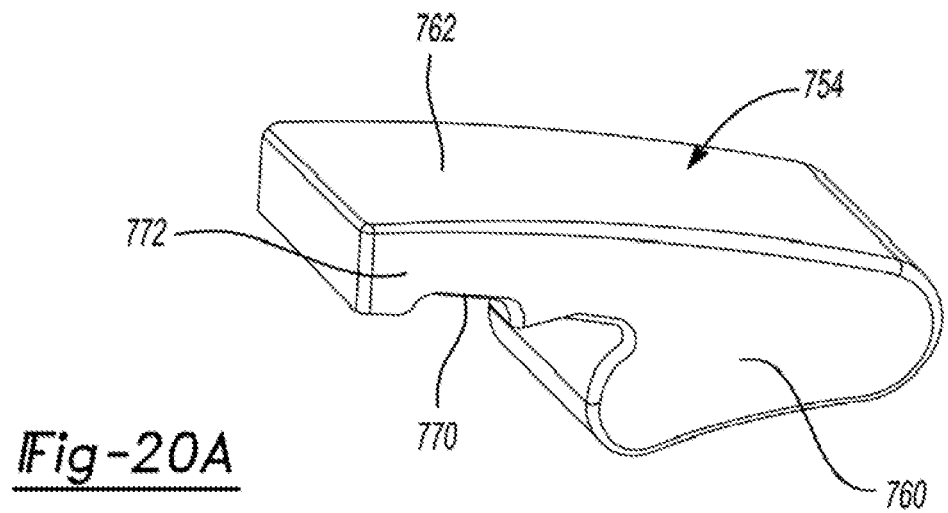
Figure 20B:
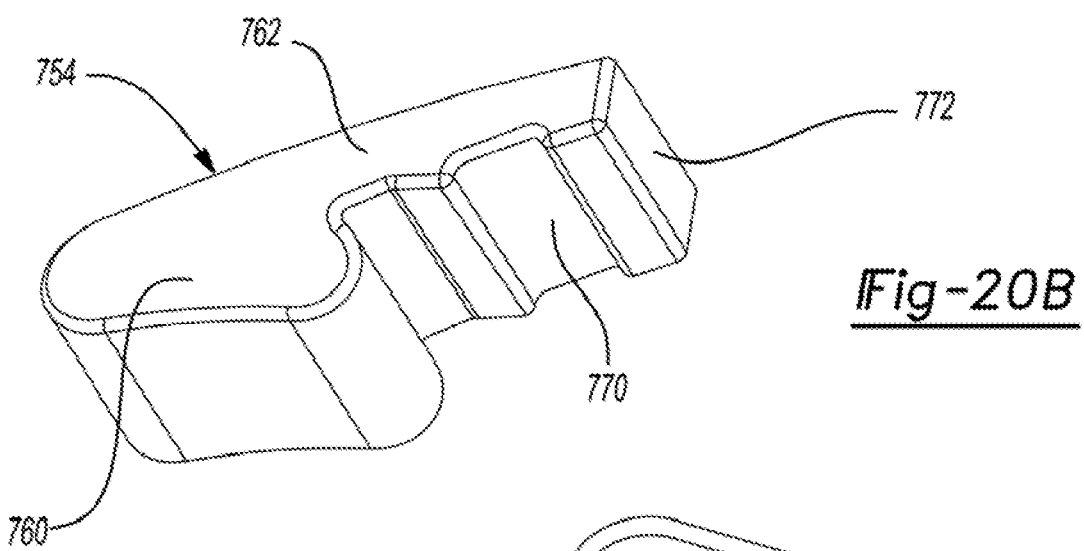
Figure 20C:
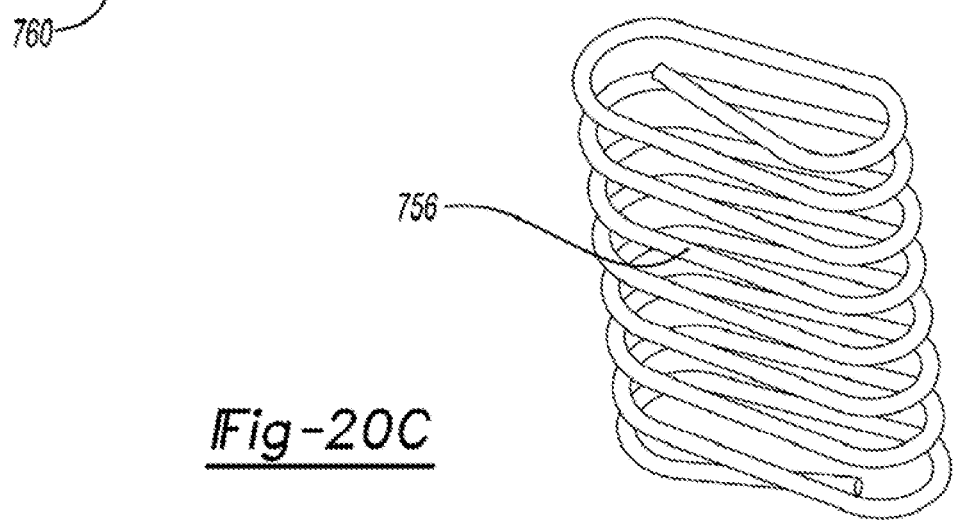
FIG. 20C is an isometric view of a racetrack-type biasing spring associated with the passive strut assembly.

Passive one-way clutch 706 includes a plurality of passive strut assemblies 750, each operably disposed in a corresponding passive strut pocket 752 formed in inner rim segment 742 of inner race 712, as best shown in FIGS. 19A and 19B. Each passive strut assembly 750 includes a passive strut 754 and a passive strut spring 756. Passive struts 754 are configured to include a base segment 760 and an engagement segment 762. Base segment 760 is shown disposed within a strut base pocket segment 764 of passive strut pocket 752 while engagement segment 762 is shown disposed within a strut engagement pocket segment 766 of passive strut pocket 752. Passive strut spring 756 is shown formed in a racetrack configuration (FIG. 20C) and has a first end retained within a spring retention segment 768 of passive strut pocket 752 and a second end engaging a retention slot 770 formed on an underside surface of engagement segment 762. FIG. 19A illustrates passive strut 754 located in a non-deployed position with passive strut spring 756 compressed such that a tip portion 772 of engagement segment 762 is displaced from engagement with inner ratchet teeth 732 on outer race 710. In contrast, FIG. 19B illustrates passive strut 754 located in a deployed position such that its tip portion 772 is in engagement with one of inner ratchet teeth 732 on outer race 710. As before, passive struts 754 function in a locked mode to prevent relative rotation between inner race 712 and outer race 710 in a first (i.e. locking) direction while allowing relative rotation therebetween in a second (i.e. freewheeling) direction.

FIGS. 18A-18E illustrate a passive strut retention arrangement 780 configured to retain each passive strut assembly 750 within its corresponding passive strut pocket 752 in inner rim segment 742 of inner race 712. Arrangement 780 generally includes a retainer plate 782 and a pair of fasteners, such as rivets 784. Retainer plate 782 is located to enclose passive strut pocket 752 and secured to inner race 712 via rivets 784 passing through plate apertures 786 formed through retainer plate 782 and mounting bores 788 formed through inner rim segment 742 of inner race 712. This arrangement 780 provides an anti-deployment feature since it prevents hydraulic fluid within clutch assembly 70 from inadvertently moving passive strut 754. The use of a plurality of individual retainer plates 782 is an improvement over use of a single ring-like collar plate in terms of space savings and simplified assembly. Rivets 784 are preferably inserted from the back side opposite pocket 752 into mounting bores 788 and is then cold formed from the front side to secure rivets 784 within plate apertures 786.

Controllable one-way clutch 708, associated with clutch assembly 700, is operably associated with electromagnetic actuator module 704 and includes an active strut assembly 800 and an electromagnetic actuator 802. Referring initially to FIGS. 21 and 229, active strut assembly 800 is shown, in this non-limiting embodiment, to include an active strut 804, an armature 806, an active strut spring assembly 808, and a contamination shield 810. Active strut 804 is disposed in strut pocket 730 formed in actuator boss 724 on outer race 710 and includes a base segment 812 and an actuation segment 814. Active strut 804 is pivotably moveable between a non-deployed position (FIG. 21B) and a deployed position (FIG. 22B) with active strut spring assembly 808 engaging base segment 812 and operable to normally bias active strut 804 toward its non-deployed position. With active strut 804 located in its non-deployed position, an end portion 816 of actuation segment 814 is displaced from engagement with outer ratchet teeth 732 on inner race 712, thereby establishing the unlocked mode of controllable one-way clutch 708. In contrast, with active strut 804 located in its deployed position, end portion 816 engages one of outer ratchet teeth 732 on inner race 712, thereby establishing the locked mode of controllable one-way clutch 708.

Figure 23:
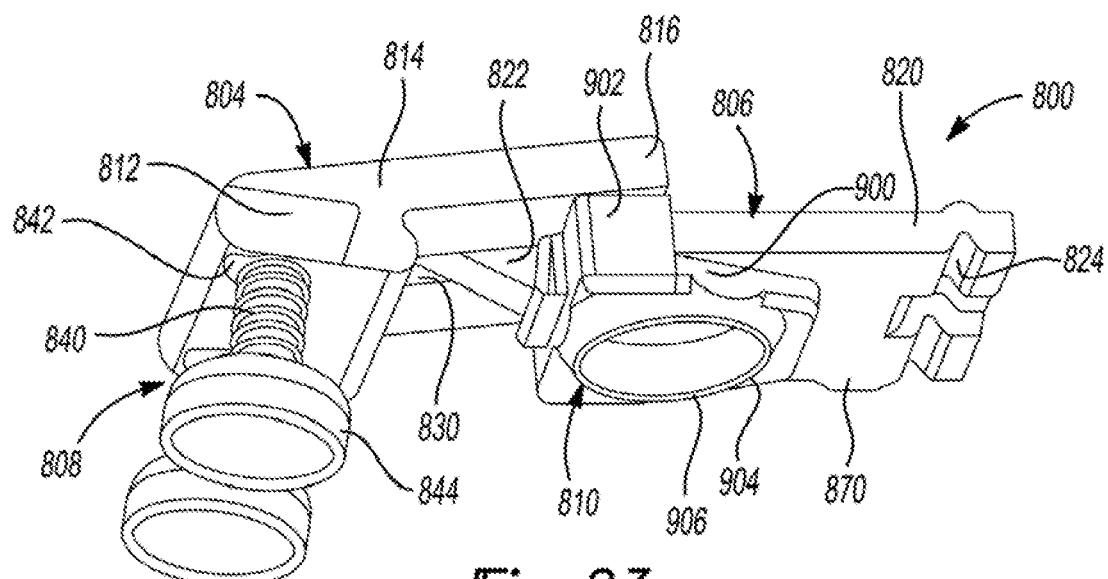
FIG. 23 is an isometric view of the active strut assembly illustrating the active strut, the armature equipped with the contamination shield, and an active strut biasing arrangement.
Figure 24A:
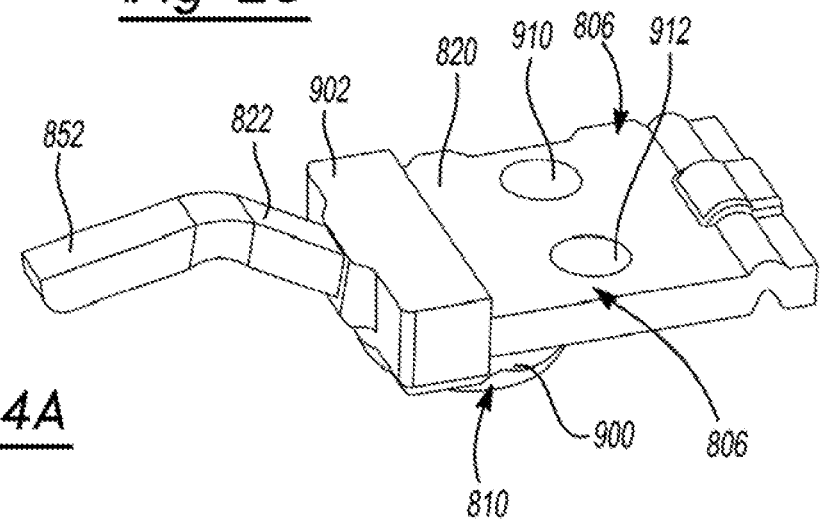
FIGS. 24A and 24B are isometric views of the armature of the active strut assembly with the contamination shield being overmolded thereon.
Figure 24B:
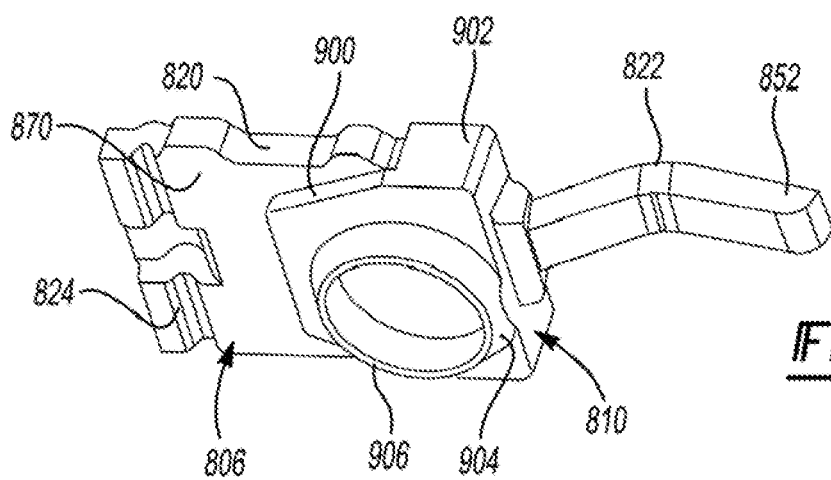

Armature 806 is made from a magnetizable material and is configured to include an attraction plate segment 820 and a pivot lug segment 822. Attraction plate segment 820 is disposed within armature pocket 728 of actuator boss 724 on outer race 710 and includes a pivot rail 824 configured to permit armature 806 to pivot between a non-actuated position (FIG. 21B) and an actuated position (FIG. 22B). Pivot leg segment 822 extends from plate segment 820 and is disposed within a pivot aperture 830 formed in actuation segment 814 of active strut 804 such that its tip portion 832 engages base segment 812 of active strut 804. Based on this arrangement, pivotal movement of armature 806 between its non-actuated and actuated positions results in corresponding pivotal movement of active strut 804 between its non-deployed and deployed positions. As will be detailed, actuation of electromagnetic actuator 802 functions to cause movement of armature 806 from its non-actuated position to its actuated position so as to cause active strut 804 to move from its non-deployed position to its deployed position in opposition to the biasing exerted thereon by active strut spring assembly 808. Upon de-actuation of electromagnetic actuator 802, active strut spring assembly 808 is permitted to forcibly pivot active strut 804 back to its non-deployed position which, in turn, causes armature 806 to move back to its non-actuated position. As best shown in FIG. 23, active strut spring assembly 808 includes a pair of helical springs 840 each having a first end retained in a spring seat 842 formed in base segment 812 of active strut 804 and a second end retained in a spring retainer 844 configured to be pressed into actuator boss 724.

Electromagnetic actuator 802 is disposed within actuator pocket 726 of actuator boss 724 on outer race 710 and generally includes a coil unit 850 surrounding a magnetic pole piece 852. Pole piece 852 is shown to be installed through an aperture 854 formed in actuator boss 724 and retained therein via a lock retainer 856 once the desired air gap 858 is established. A cover housing 860 is secured to actuator boss 724 via a U-shaped strap bracket 862 and a pair of fasteners 864 to enclose electromagnetic actuator 802 within actuator pocket 726. Upon energization of coil unit 850, a magnetic attraction is established between pole piece 852 and armature 806 which functions to pivot armature 806 to its actuated position which, in turn, causes active strut 804 to pivot to its deployed position.

Due to the magnetic attraction noted above, it is possible for ferrous debris and particles suspended in the fluid flowing through clutch assembly 700 to be attracted to, and collect between, the interface between the terminal end of pole piece 852 and an underside surface 870 of armature 806. Such collection of ferrous debris is undesirable in that such debris can detrimentally impact the ability of armature 806 to move completely to its actuated condition which, in turn, could impact complete deployment of active strut 804. Accordingly, one aspect of the present disclosure is directed to providing contamination shield 810 between underside surface 870 of armature 806 and the exposed tip portion 872 of pole piece 852. Contamination shield 810 is configured to prevent or inhibit ferrous debris from finding their way to the interface between pole piece portion 872 and armature 806. Contamination shield 810 is a non-magnetic component, made from a non-ferrous material, and is configured to be secured to armature 806 for movement therewith. As best seen from FIGS. 21-24, contamination shield 816 is configured, in this non-limiting embodiment, to include a body segment 900 and an over-mold segment 902. Body segment 900 is mounted to underside surface 870 of armature 806 and has a tubular portion 904 defining a throughbore 906 sized and arranged to surround end portion 872 of pole piece 852 as armature 806 pivots between its non-actuated and actuated positions. The length of tubular portion 904 and the diameter of throughbore 906 are selected to enclose tip portion 872 of pole piece 852 during movement of armature 806. Body segment 900 is shown secured to plate segment 820 of armature 806 via a pair of posts 910 (snap-in or molded-in) retained in mounting holes 912. Over-molded segment 902 surrounds the portion of armature 806 associated with the interface between attraction plate segment 820 and pivot leg segment 822.

Figure 25A:
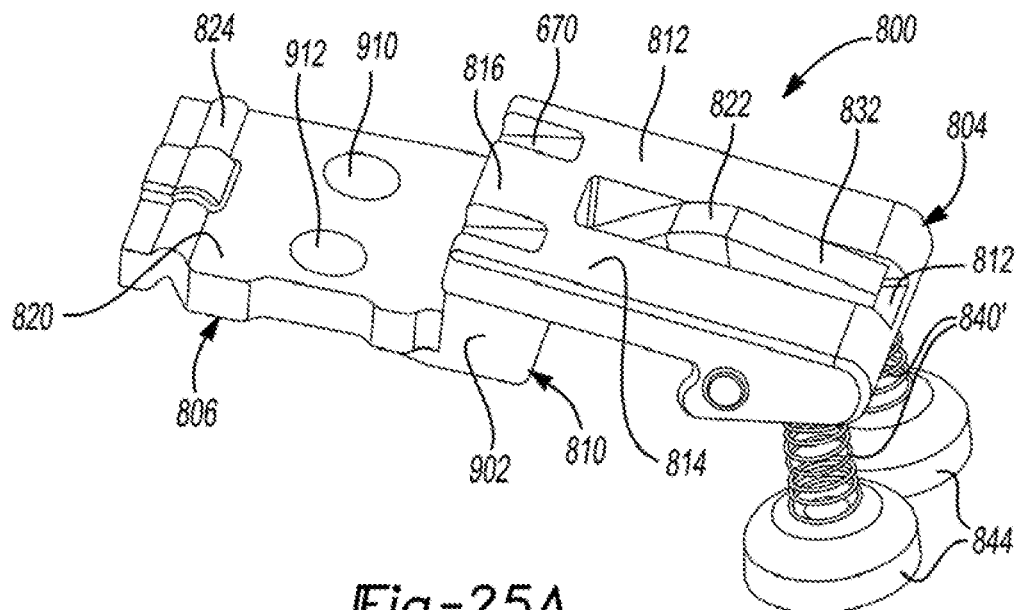
FIGS. 25A and 25B are isometric views of a slightly modified version of the active strut assembly now equipped with a conical active strut biasing arrangement and the active strut having hydraulic deployment prevention features.
Figure 25B:
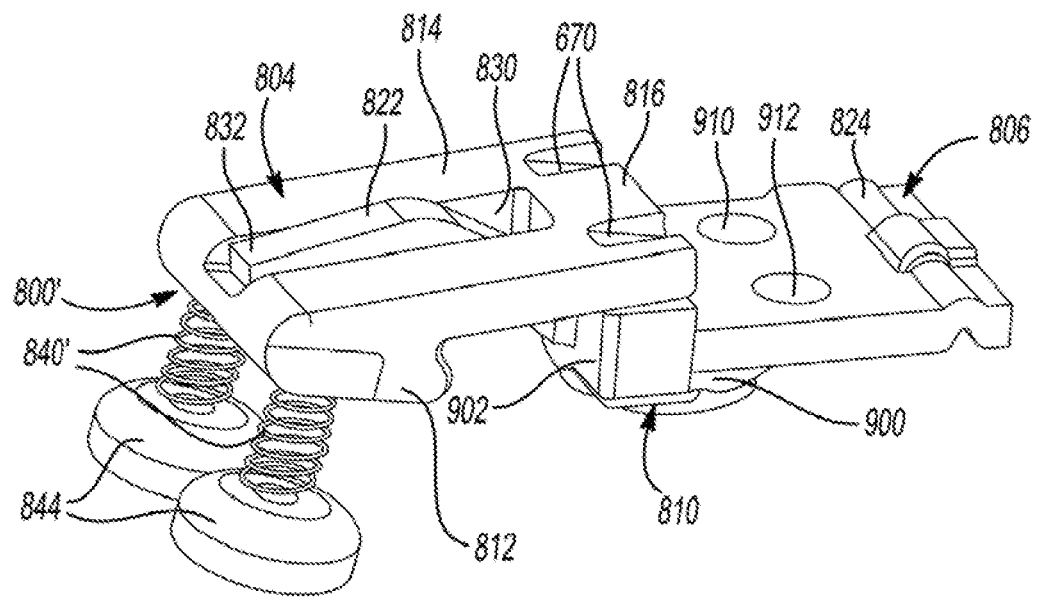
Figure 26B:
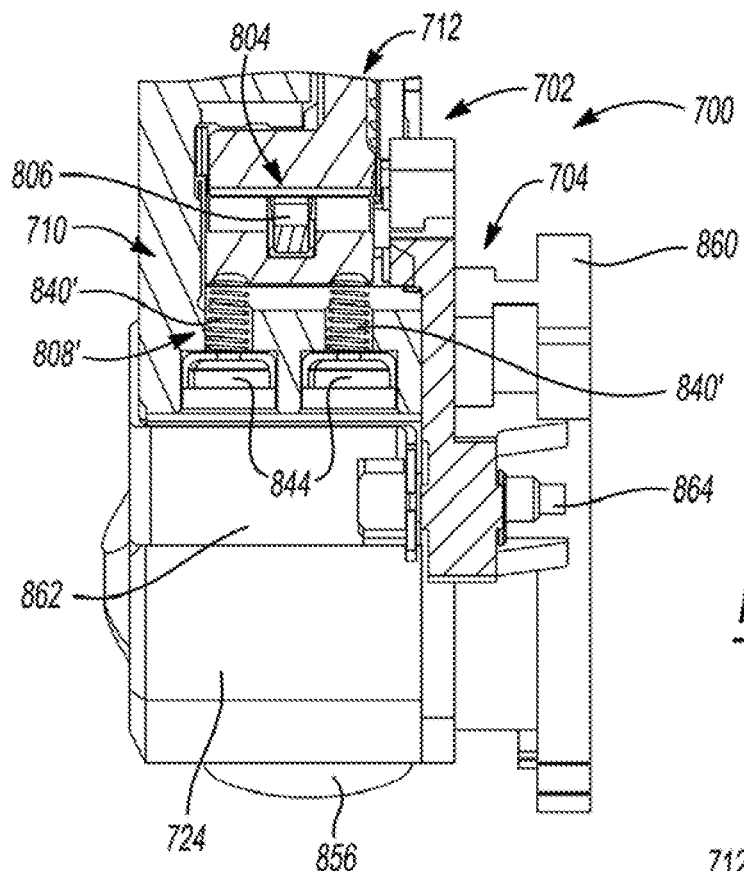
FIG. 26A is a partial isometric view and FIG. 26B is an end view, both illustrating the electromagnetic actuator module operably mounted to the outer race of the clutch module and equipped with the active strut assemblies of FIGS. 25A and 25B.
Figure 26A:
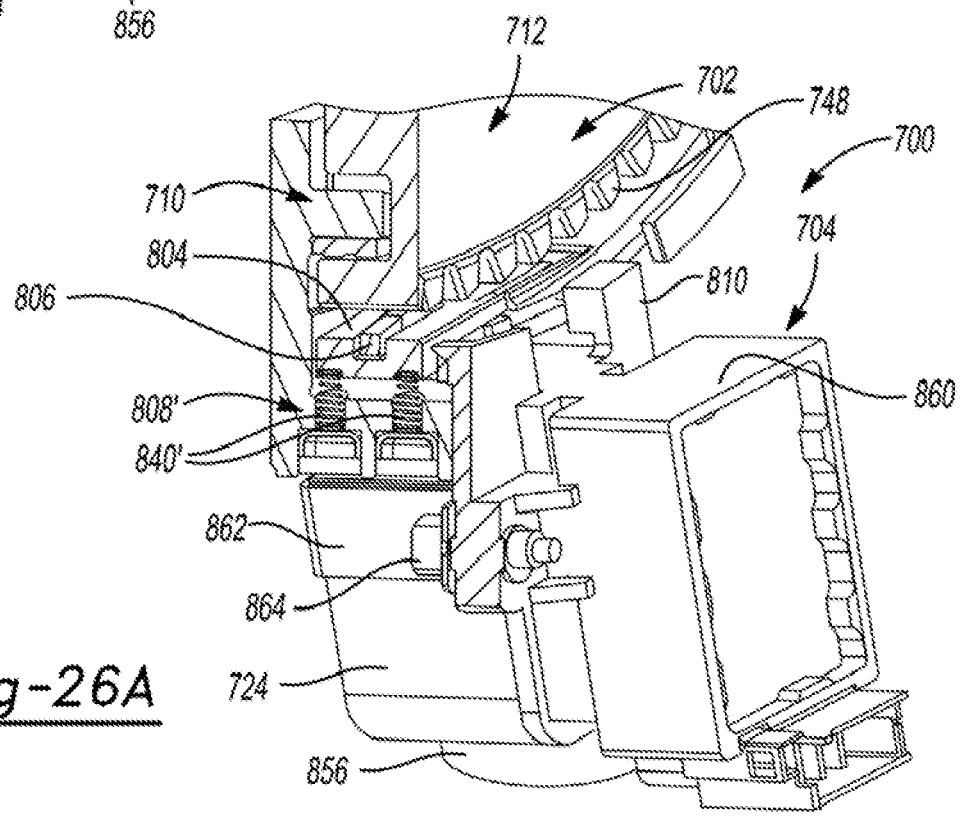

Referring now to FIGS. 25 and 26, a slightly revised version of active strut assembly 800 is shown and identified as active strut assembly 800'. Basically, active strut 804 is now shown to include the hydrodynamic features (i.e. ramped spoilers 670) previously disclosed in great detail. In addition, active strut spring assembly 808 is now shown equipped with conical coil springs 840'. Conical springs 840' are potentially an improvement over cylindrical springs 840 due to the motion of active strut 804, in particular the arc path and the skewing. Cylindrical springs 840 may have a tendency to rub or grab on the side of the spring seat 842 in base segment 812 of active strut 804. In contrast, conical springs 840' are tapered to provide additional clearance with respect to spring seats 842, with the taper configured with a larger diameter at cup retainer 844 and smaller diameter at spring seat 842.

Figure 27A:
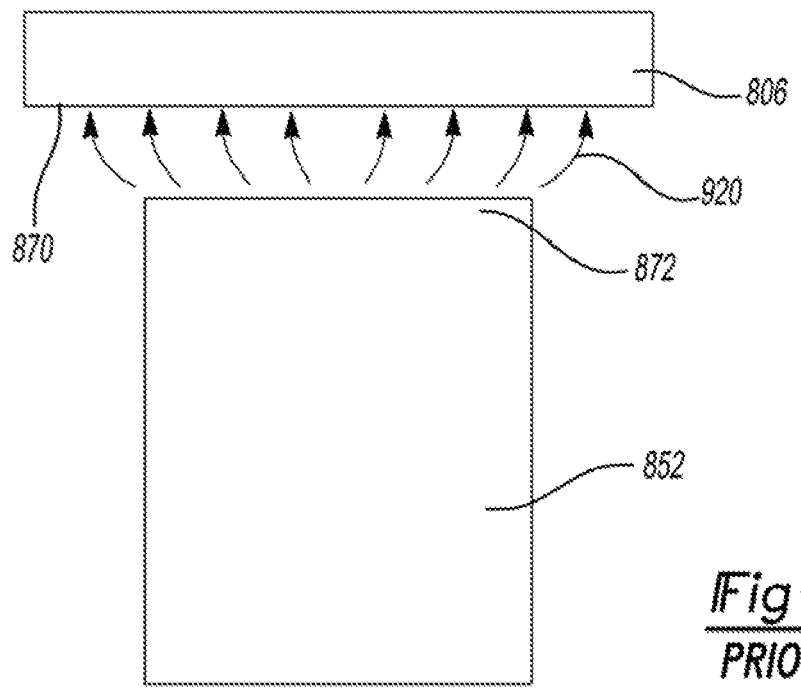
FIGS. 27A and 27B are diagrammatical illustrations of an airgap established between the pole piece of the coil assembly and the armature of the active strut assembly in a conventional arrangement.
Figure 27B:
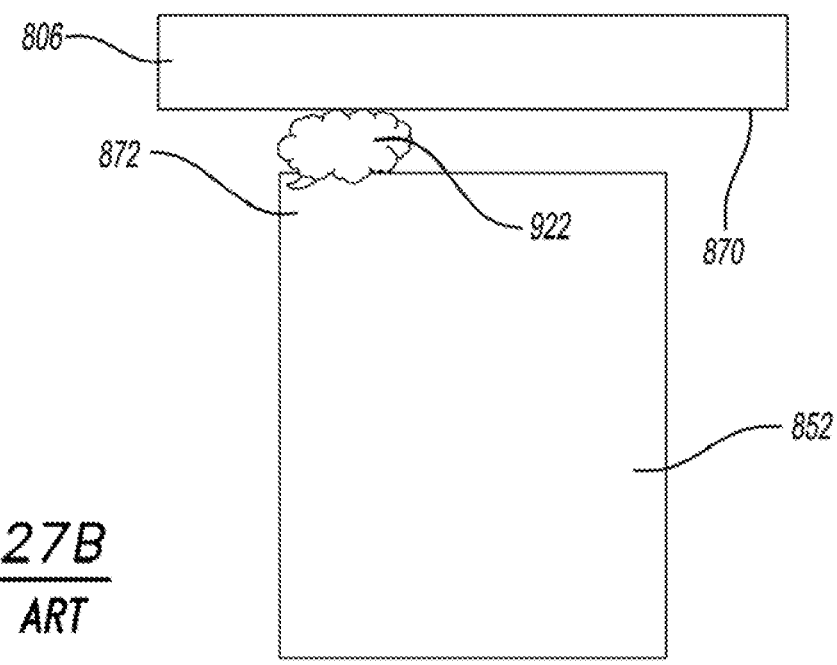
Figure 28A:
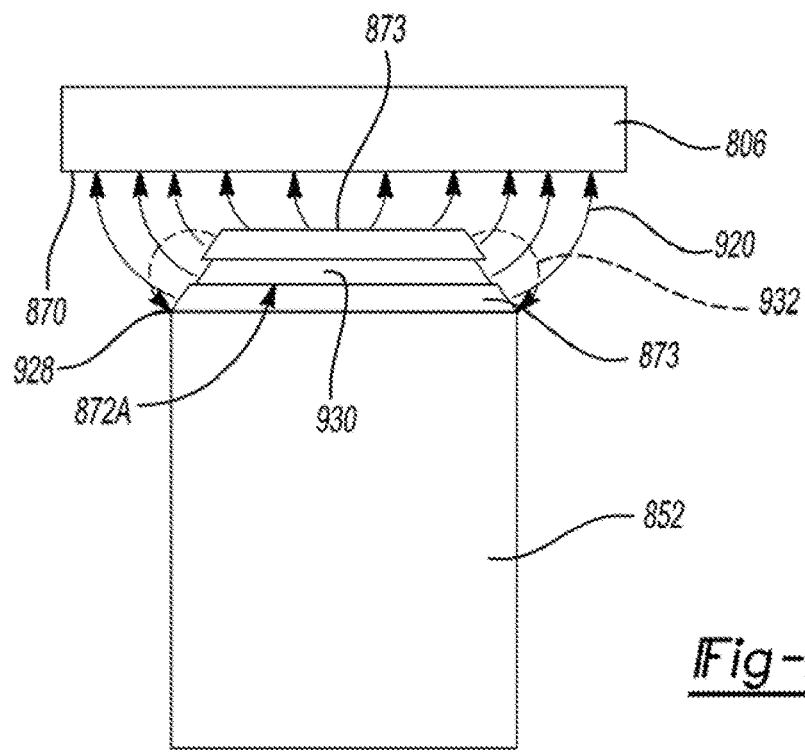
FIGS. 28A and 28B generally relate to FIGS. 27A and 27B, respectively, but illustrate a debris retention feature associated with the pole piece of the coil assembly.
Figure 28B:
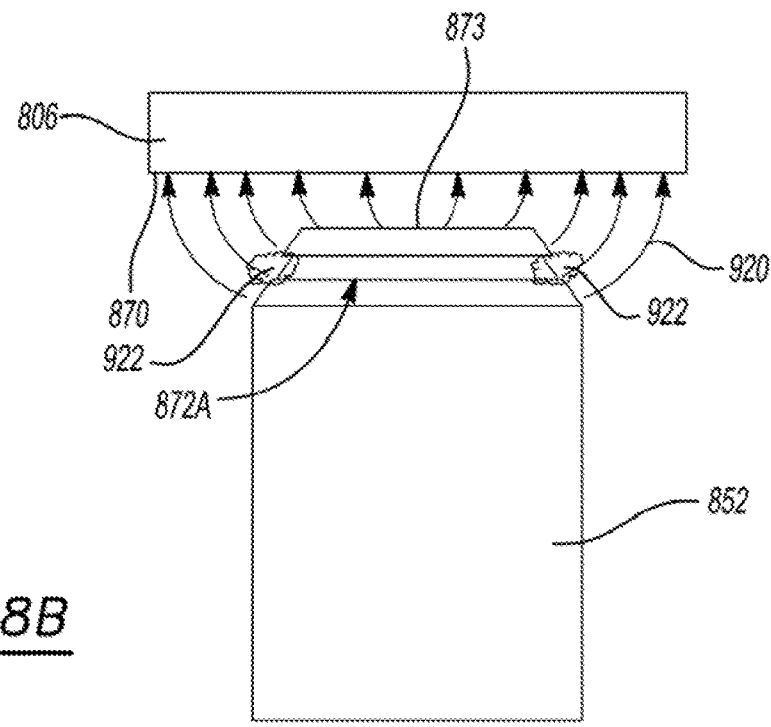
Figure 30A:
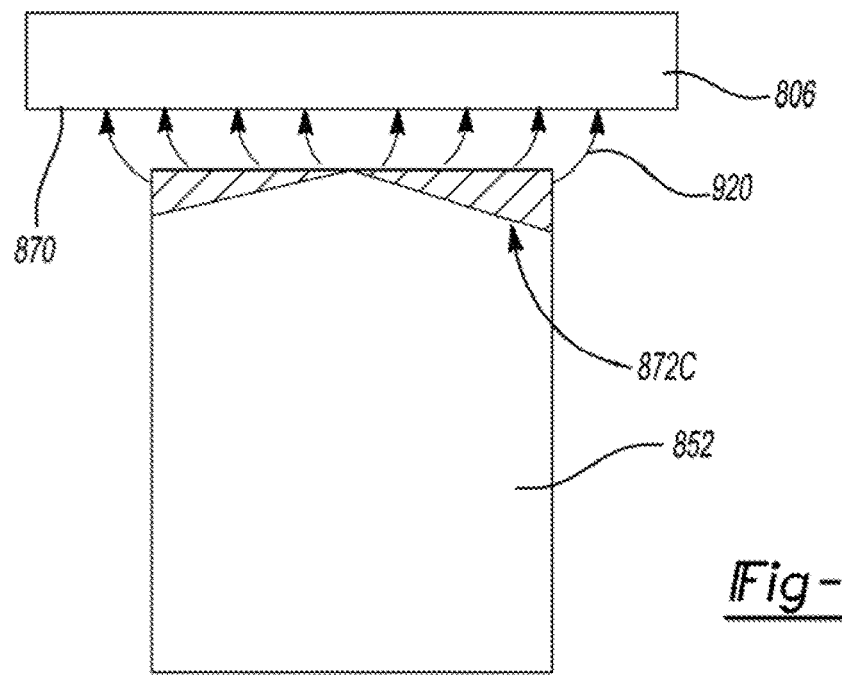
FIGS. 30A and 30B illustrate yet another alternative debris elimination feature associated with the pole piece of the coil assembly.
Figure 30B:
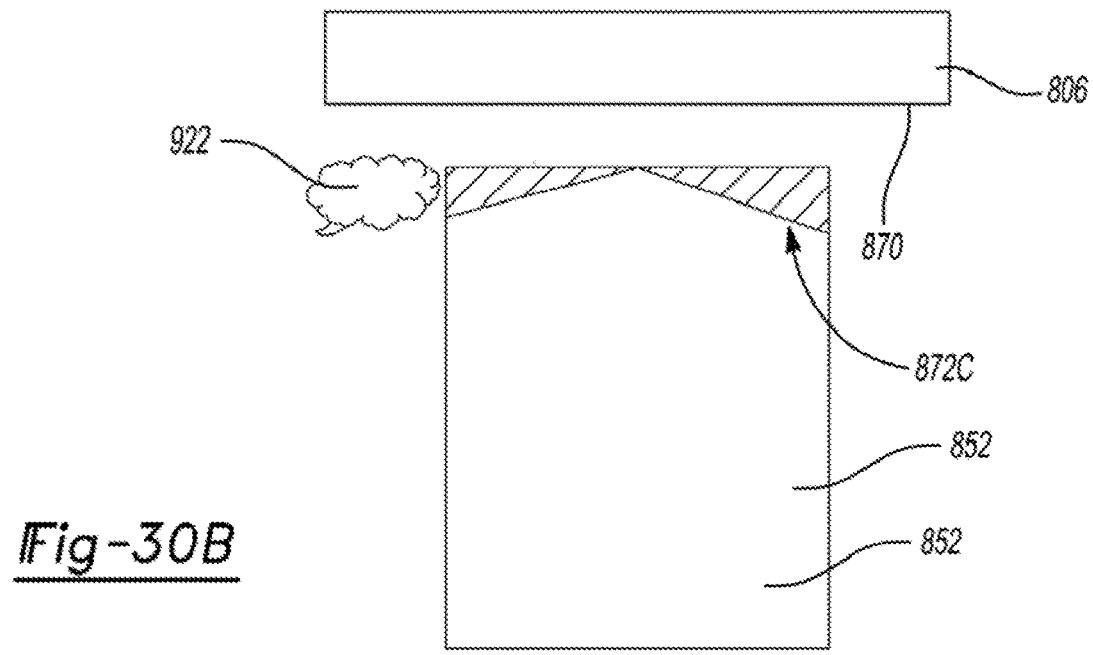

Referring now to FIGS. 27A and 27B, a conventional magnetic relationship is shown between pole piece 852 of coil unit 850 and armature 806, with arrows 920 indicating the magnetic flux path therebetween and debris 922 located between tip portion 872 of pole piece 852 and surface 870 of armature 806. Contamination shield 810 is presented to address and overcome this situation. As an alternative to, or in addition to, installation of contamination shield 810 on armature 806, another aspect of the present disclosure is direct to modifying tip portion 872 of pole piece 852 in a way that is configured to direct ferrous debris 922 away from face surface 873 on tip portion 872. To this end, FIGS. 28A and 28B illustrate tip portion 872A of pole piece 852 chamfered to define a frusto-conical edge profile 928 which is undercut to define an annular groove 930. Groove 930 creates a secondary magnetic flux path or field (arrows 932) which functions to draw ferrous debris 922 into groove 930 and away from face surface 873. As a further alternative, FIGS. 29A and 29B illustrate tip portion 872B chamfered to define a frusto-conical edge profile 928. An annular groove 934 is formed in tip portion 872B below chamfered edge 928. In addition, a cavity 936 is formed in face surface 873. Both groove 934 and cavity 936 function to draw ferrous debris 922 therein and away from face surface 873. Finally, FIGS. 30A and 30B illustrate the concept of adding a non-magnetic coating, such as PTFE, to at least one of underside surface 840 of armature 806 and face surface 873 of pole piece 852 to prevent collection of ferrous debris. This would create a gap between the debris and the magnetized surfaces. Additionally, face surface 873 of pole piece 852 would be allowed to contact surface 870 of armature 806 with the coating shaped so as to push debris away from these mating surfaces.

It is another aspect of the present disclosure to locate magnets on opposite sides of actuator boss 724 of outer race 710 to collect and trap debris prior to entering armature pocket 728 and/or strut pocket 730. To this end, FIG. 31 illustrates a portion of outer race 710 with a pair of debris-collecting magnets 950 pressed into outer ring segment 714 in proximity to actuator boss 724. Bi-directional oil flow is indicated by flow arrows 952 to illustrate fluid carrying ferrous debris 922 approaching actuator boss 724. This concept requires that magnets 950 provide a stronger magnetic field than the electromagnetic field generated upon energization of coil unit 850 as well as any residual magnetism remaining in the system.

Figure 33:
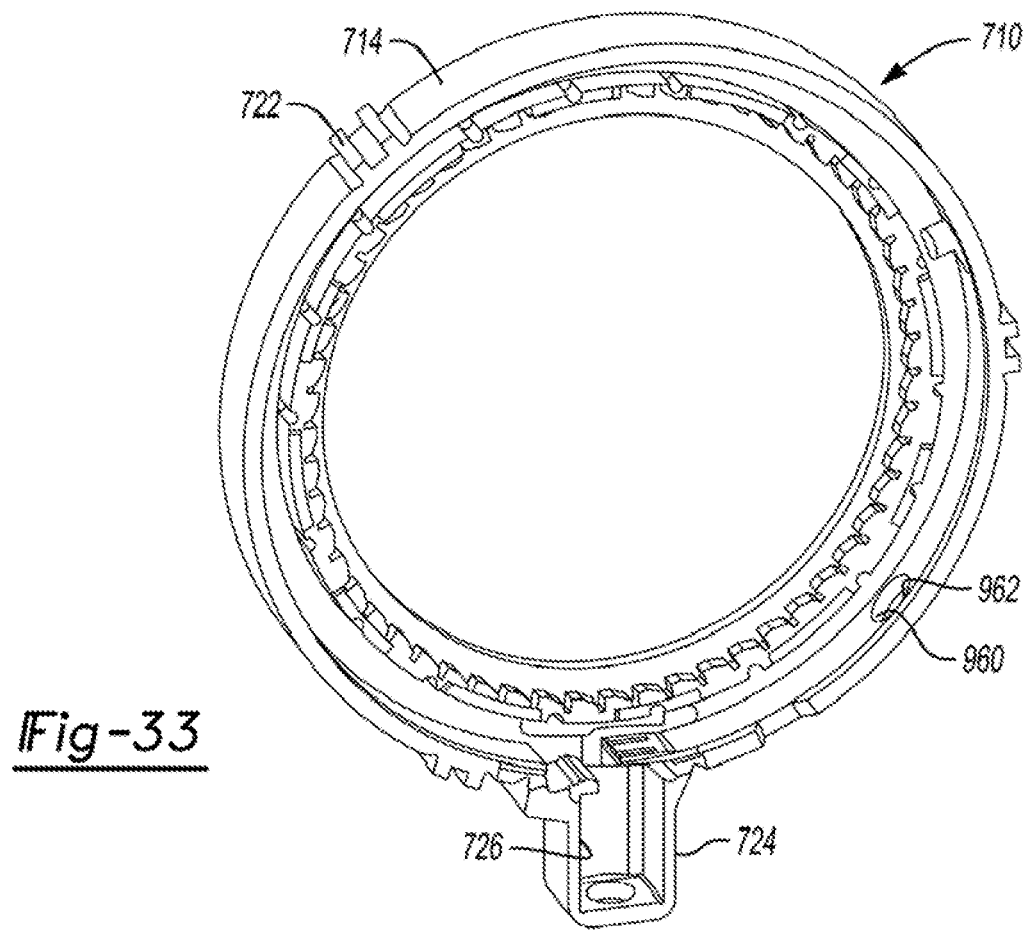
FIGS. 33 and 34 are isometric views of the outer race of the clutch module illustrating location of the pressed-in magnetics similar to the arrangement shown in FIG. 32.
Figure 34:
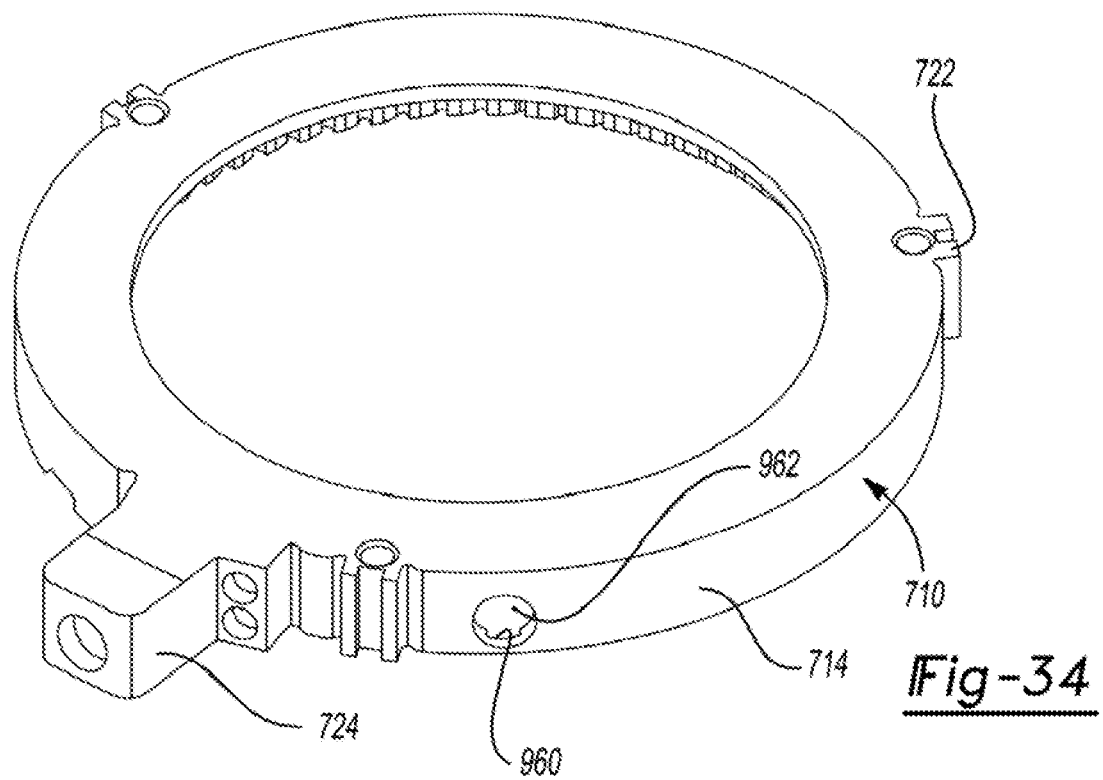
Figure 35A:
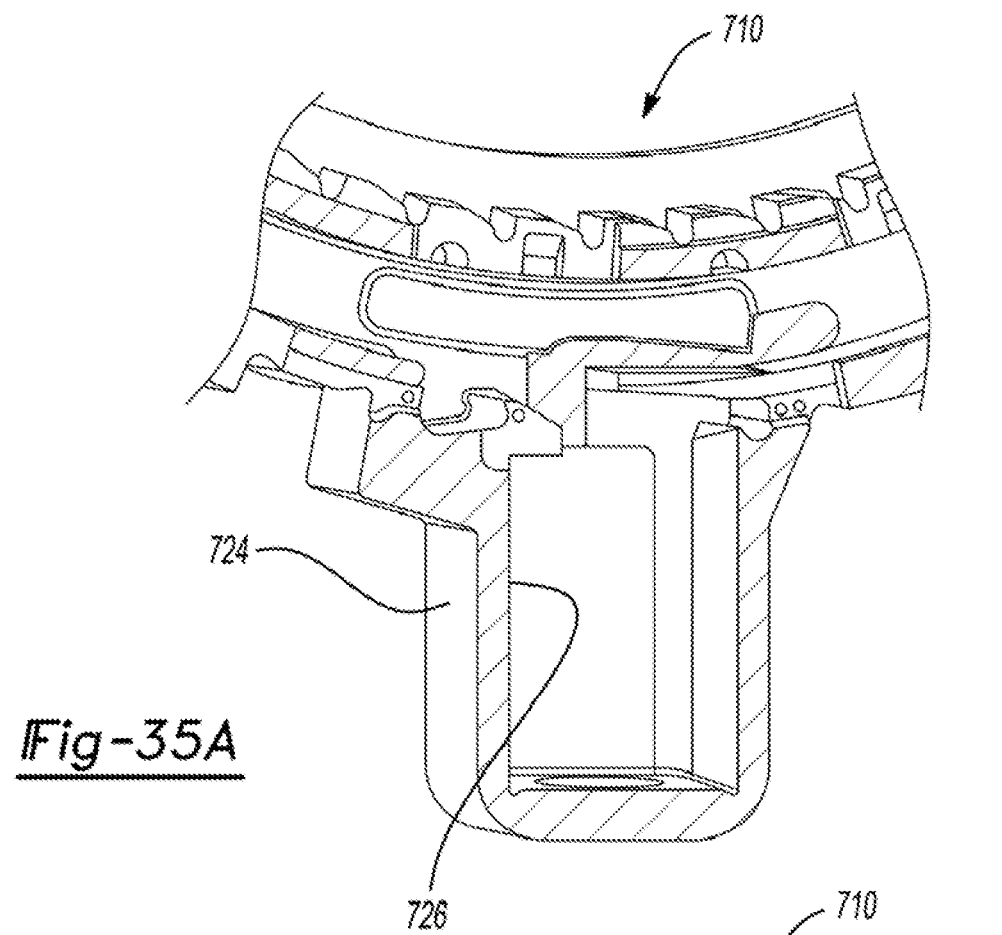
FIGS. 35A and 35B illustrate the actuator pocket segment of the outer race.
Figure 35B:
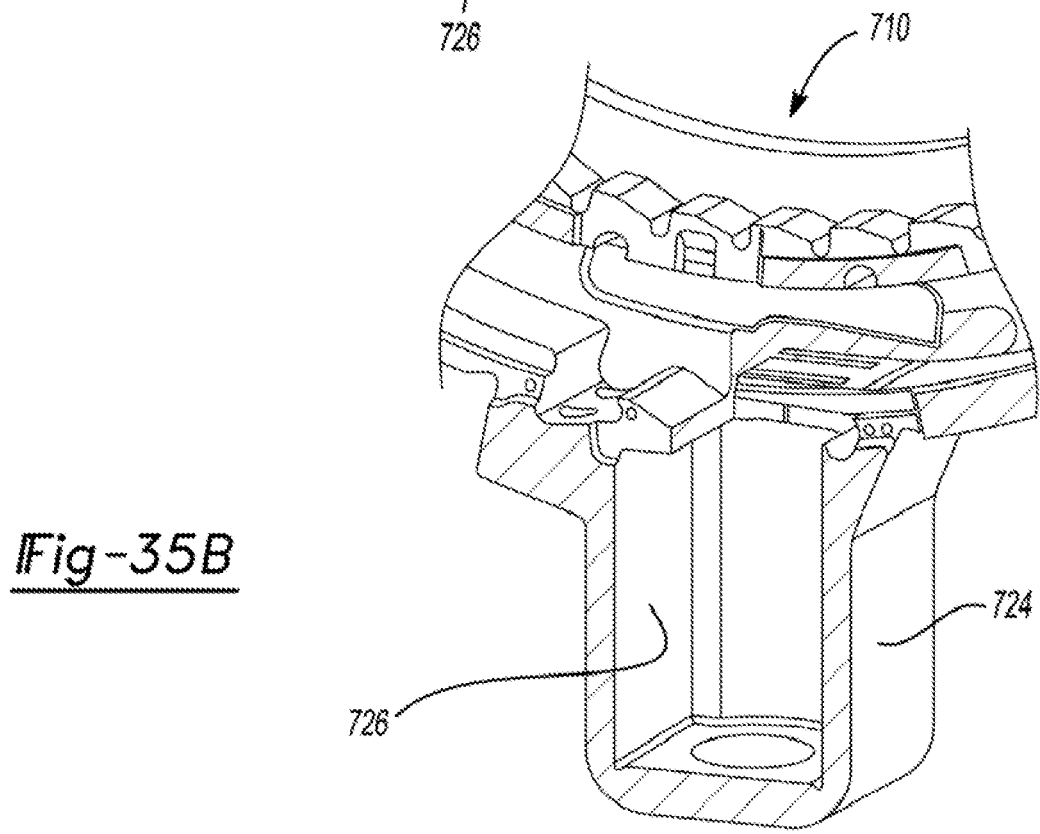

FIGS. 32-36 illustrate use of debris-collecting magnetic rings 960 pressed into fluid flow ports 962 formed through outer ring segment 714 of outer race 710. Thus, as fluid is discharged through ports 962, debris is collected by magnetic rings 960. FIGS. 33 and 34 illustrate outer race 710 with a single flow port 962 and pressed-in magnetic ring 960. FIG. 36A illustrates outer race 710 having flow ports 962 with magnetic rings 960 on opposite sides of actuator boss 724 while FIG. 36B illustrates a pair of flow parts 962 and magnetic rings 960 provided on one side of outer race 710.

In summary, the present disclosure provides several solutions applicable to one-way clutches, and particularly controllable one-way clutches, that address unintended and/or partial strut deployment via hydraulic deployment prevention arrangements and/or debris collection prevention arrangements. While the use of the contamination shield and modified pole piece tip profiles have been shown in association with an indirect strut actuation arrangement, those skilled in this art will understand that the solutions provided herein are equally applicable to direct strut actuation arrangements. For example, the contamination shield can be configured for use with a translatable pole piece of the electromagnetic actuator acting directly on the active strut. In such an arrangement, the contamination shield could be mounted to an underside portion of the active strut and/or surrounding a tip portion of the moveable pole piece. The use of a contamination shield or "shroud" surrounding the exposed tip portion of the magnetic pole piece, regardless of its mounting location, functions to prevent or block ferrous particles from finding their way into a location capable of interfering with actuation of the controllable one-way clutch.

While the one-way clutch is disclosed in association with a bi-directional clutch assembly, the inventive concepts of the present disclosure find application in other types of clutch assemblies such that the particular embodiments disclosed are understood not to limit the present disclosure. Likewise, the use of the bi-directional clutch in an automatic transmission is non-limiting since the controllable one-way clutch of the present disclosure can be used in any motor vehicle application (i.e. disconnect clutch, torque transfer clutch, etc.) for selectively coupling and uncoupling a first rotary component to a second stationary component or rotary component.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A selectable one-way clutch, comprising:
a clutch module including a first clutch member and a second clutch member having a plurality of cam surfaces, wherein at least one of said first and second clutch members is adapted to rotate relative to the other of said first and second clutch members; and
an electromagnetic actuator including an energizeable coil assembly secured to said first clutch member and having a magnetic pole piece, a first member mounted on said first clutch member for movement relative to said coil assembly between a non-actuated position and an actuated position, a second member mechanically coupled to said first member such that movement of said first member between its non-actuated and actuated position causes concomitant pivotal movement of said second member between a released position displaced from engagement with said cam surfaces on said second clutch member and a locked position in engagement with one of said cam surfaces on said second clutch member, a biasing member for normally biasing said second member to its released position, and a debris containment arrangement configured to prevent debris from interfering with movement of said first member relative to said coil assembly, wherein said debris containment arrangement comprises a non-magnetic contamination shroud attached to said first member and configured to enclose a tip portion of said pole piece during movement of said first member between its actuated and non-actuated positions.

2. The selectable one-way clutch of claim 1, wherein said first member is a magnetic armature that is pivotably moveable relative to said magnetic pole piece of said coil assembly, and wherein said contamination shroud is secured to a portion of said armature that is facing said tip portion of said pole piece and is configured to inhibit collection of magnetizeable debris therebetween.

3. The selectable one-way clutch of claim 2, wherein the contamination shroud includes a tubular portion having a throughbore aligned to surround said tip portion of the pole piece during pivotal movement of the armature between its non-actuated and actuated positions.

4. The selectable one-way clutch of claim 3, wherein said armature includes a first end segment pivotably mounted to said first clutch member, a second end segment mechanically coupled to said second member, and an intermediate segment between said first and second end segments, and wherein said contamination shroud is secured to said intermediate segment of said armature.

5. The selectable one-way clutch of claim 4, wherein said contamination shroud includes a body segment from which said tubular portion extends and which engages a planar surface of said intermediate segment of said armature, and an over-mold segment connected to said body segment and being configured to surround said intermediate segment of said armature.

6. The selectable one-way clutch of claim 4, wherein said second member is a non-magnetic active strut having a base segment pivotably mounted to said first clutch member and connected to said second end segment of said armature, and an engagement segment having an end portion configured to engage said cam surfaces.

7. The selectable one-way clutch of claim 6, wherein energization of said coil assembly generates a magnetic field operable to attract said armature toward said pole piece and cause said armature to pivot from its non-actuated position into its actuated position which causes said active strut to pivot from its released position into its locked position in opposition to the biasing of said biasing member.

8. The selectable one-way clutch of claim 1, wherein said first member is a magnetic armature that is pivotably moveable relative to said tip portion of said magnetic pole piece, and wherein said debris containment arrangement further includes a debris collection feature formed on said tip portion of said pole piece.

9. The selectable one-way clutch of claim 8, wherein said debris collection feature includes a chamfered edge profile formed on said tip portion of said pole piece, and a collection groove formed in said chamfered edge profile.

10. The selectable one-way clutch of claim 8, wherein said debris collection feature includes a chamfered edge profile and a collection groove formed in said tip portion of said pole piece.

11. The selectable one-way clutch of claim 10, wherein said collection groove is formed below said chamfered edge profile.

12. The selectable one-way clutch of claim 8, wherein said debris collection feature is a coating of non-magnetic material provided on at least a segment of said tip portion of said pole piece.

13. The selectable one-way clutch of claim 1, wherein said first member is a magnetic armature and said second member is a non-magnetic active strut, wherein said magnetic armature is disposed between the non-magnetic active strut and said magnetic pole piece of said coil assembly, and wherein said non-magnetic shroud surrounds said tip portion of said pole piece for inhibiting collection of magnetizeable debris between said armature and said pole piece.

14. The selectable one-way clutch of claim 13, wherein said shroud includes a tubular portion extending from an underside surface of said armature for movement therewith relative to said tip portion of said pole piece.

15. The selectable one-way clutch of claim 1, wherein said coil assembly is mounted to said first clutch member, wherein said first member is a magnetic armature pivotably moveable relative to said pole piece, wherein said armature includes a first end segment pivotably mounted on said first clutch member, a second end segment mechanically connected to said second member, and an intermediate segment establishing a magnetic circuit with said pole piece upon energization of said coil assembly, and wherein said contamination shroud is fixed to said intermediate segment of said armature and configured to surround said tip portion of said pole piece.

16. A selectable one-way clutch, comprising:
a first clutch member;
a second clutch member rotatable relative to said first clutch member and having a plurality of ratchet teeth;
an electromagnetic actuator having an energizeable coil assembly secured to said first clutch member and a magnetic pole piece;
a magnetic armature having a first end segment retained in an armature pivot channel formed in said first clutch member, a second end segment, and an intermediate segment between said first and second end segments, wherein said armature is pivotally movable relative to said coil assembly between a non-actuated position when said coil assembly is non-energized and an actuated position when said coil assembly is energized;
a non-magnetic strut having a base segment disposed in a strut pivot channel formed in said first clutch member and engaging said second end segment of said armature and an engagement end segment, wherein movement of said armature between its non-actuated and actuated positions causes concomitant pivotal movement of said strut from a released position whereat said engagement end segment is disengaged from said ratchet teeth on said second clutch member and a locked position whereat said engagement end segment is in latched engagement with said ratchet teeth;
a strut biasing member normally biasing said strut to its released position; and
a non-magnetic contamination shroud disposed on said intermediate segment of said armature and configured to inhibit collection of magnetizeable debris between said pole piece and said intermediate segment of said armature;
wherein said contamination shroud includes a body portion defining a throughbore, wherein a gap is defined between said intermediate segment of said armature and an end portion of said pole piece aligned with said throughbore, and wherein the gap is reduced when said armature moves from its non-actuated position toward its actuated position.

17. The selectable one-way clutch of claim 16, wherein said magnetic pole piece is aligned with said intermediate segment of said armature, wherein said contamination shroud is fixed to said armature, and wherein said body portion includes a tubular portion configured to surround said end portion of said pole piece.

18. The selectable one-way clutch of claim 16, wherein said armature and said strut are oriented such that said armature is disposed between said magnetic pole piece of said coil assembly and said strut in an under-strut configuration, and wherein energization of said coil assembly generates a magnetic circuit that attracts said intermediate segment of said armature toward said pole piece and forcibly moves said armature from its non-actuated position to its actuated position which causes said second end segment to act on said base segment of said strut and move said strut from its released position to its locked position in opposition to the biasing of said strut biasing member.

19. A selectable one-way clutch, comprising:
a first clutch member;
a second clutch member rotatable relative to said first clutch member and having a plurality of ratchet teeth;
an electromagnetic actuator secured to said first clutch member and having an energizeable coil assembly with a magnetic pole piece;
a magnetic strut having a base segment disposed in a strut pivot channel formed in said first clutch member and an engagement segment having a tip portion engageable with said ratchet teeth on said second clutch member when said strut moves from a released position into a locked position in response to energization of said coil assembly;
a strut biasing member normally biasing said strut toward its released position; and
a non-magnetic contamination shroud having a tubular portion configured to surround an end portion of said pole piece to inhibit collection of magnetizeable debris therebetween.

20. The selectable one-way clutch of claim 19, wherein said contamination shroud is fixed to said strut.

* * * * *